United States Patent
Senarath et al.

(10) Patent No.: US 10,313,965 B2
(45) Date of Patent: Jun. 4, 2019

(54) METHOD AND SYSTEM FOR MOBILE DEVICE TO UTILIZE CHANNELS WITH LOW POWER CONSUMPTION

(71) Applicant: Huawei Technologies Co., Ltd, Guangdong (CN)

(72) Inventors: Nimal Gamini Senarath, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 209 days.

(21) Appl. No.: 14/702,234

(22) Filed: May 1, 2015

(65) Prior Publication Data

US 2016/0323818 A1    Nov. 3, 2016

(51) Int. Cl.
| | | |
|---|---|---|
| *H04W 52/02* | (2009.01) | |
| *H04W 16/02* | (2009.01) | |
| *H04W 72/08* | (2009.01) | |

(52) U.S. Cl.
CPC .......... *H04W 52/02* (2013.01); *H04W 16/02* (2013.01); *H04W 52/0209* (2013.01); *H04W 52/0277* (2013.01); *H04W 72/082* (2013.01); *Y02D 70/142* (2018.01); *Y02D 70/144* (2018.01); *Y02D 70/164* (2018.01)

(58) Field of Classification Search
CPC ............... H04W 72/082; H04W 52/02; H04W 52/0277; H04W 16/02; H04W 52/0209; Y02D 70/142; Y02D 70/164; Y02D 70/144

See application file for complete search history.

(56) References Cited

U.S. PATENT DOCUMENTS

| | | | | |
|---|---|---|---|---|
| 9,425,944 B1* | 8/2016 | Singh | .................... | H04L 5/0058 |
| 2002/0160747 A1* | 10/2002 | Tsuchihashi | ......... | G08B 25/016 |
| | | | | 455/404.1 |
| 2005/0096061 A1* | 5/2005 | Ji | .......................... | H04W 16/02 |
| | | | | 455/450 |
| 2009/0061778 A1* | 3/2009 | Vrzic | .................... | H04W 16/02 |
| | | | | 455/62 |

(Continued)

FOREIGN PATENT DOCUMENTS

| | | |
|---|---|---|
| WO | 2013040162 A1 | 3/2013 |
| WO | 2014113193 A1 | 7/2014 |

*Primary Examiner* — Kwang B Yao
*Assistant Examiner* — Moo Jeong
(74) *Attorney, Agent, or Firm* — Slater Matsil, LLP

(57) ABSTRACT

The present invention facilitates efficient and effective power management for wireless telecommunications. In one embodiment, presented approaches enable power savings in devices with a limited power supply (e.g., mobile devices operating on battery power supply, photocell, etc.). In one exemplary implementation, power smart channels facilitate power conservation. Power smart channel communications can be transmitted at lower power levels than conventional or normal channel communications. Presented power smart channel methods and systems can be implemented in a wireless cellular communication environment where power smart channels are established and used in accordance with various aspects and configurations of the components (e.g., location, remaining battery charge, multiple resource bands, etc.) in the wireless cellular communication environment.

13 Claims, 17 Drawing Sheets

1500

| Channel | Mechanism | Mobile Device Pre-requisite | Power Savings Mode | Business Pre-requisite |
|---|---|---|---|---|
| A | Interference Restriction Designated Portion of Cell Coverage Area | Located in area close to base station | 1-3 | Pay Premium Level 1 |
| B | 3 Multiple Channels | Located in area close to cell edge | 4 - 5 | Pay Premium Level 2 |
| C | Interference Restriction Entire Cell Coverage Area | None | None | None |
| D | Interference Prevention/Restriction and 3 Multiple Channels | Located in area close to cell edge. | 10 | Pay Premium Level 4 |

(56) References Cited

U.S. PATENT DOCUMENTS

| | | | | |
|---|---|---|---|---|
| 2010/0167743 A1* | 7/2010 | Palanki | ............... | H04B 7/155 |
| | | | | 455/436 |
| 2011/0111783 A1* | 5/2011 | Chayat | ............... | H04W 16/12 |
| | | | | 455/509 |
| 2011/0159903 A1* | 6/2011 | Yuk | ............... | H04L 5/0094 |
| | | | | 455/507 |
| 2012/0307750 A1* | 12/2012 | Hunukumbure | ...... | H04W 16/10 |
| | | | | 370/329 |
| 2013/0196709 A1* | 8/2013 | Nho | ............... | G06F 1/324 |
| | | | | 455/550.1 |
| 2014/0349663 A1 | 11/2014 | Shu | | |
| 2016/0302152 A1* | 10/2016 | Morita | ............ | H04W 52/0212 |

\* cited by examiner

1500

| | 1510 | 1520 | 1530 | 1540 | 1550 |
|---|---|---|---|---|---|
| | Channel | Mechanism | Mobile Device Pre-requisite | Power Savings Mode | Business Pre-requisite |
| | A | Interference Restriction Designated Portion of Cell Coverage Area | Located in area close to base station | 1-3 | Pay Premium Level 1 |
| | B | 3 Multiple Channels | Located in area close to cell edge | 4 - 5 | Pay Premium Level 2 |
| | C | Interference Restriction Entire Cell Coverage Area | None | None | None |
| | D | Interference Prevention/Restriction and 3 Multiple Channels | Located in area close to cell edge. | 10 | Pay Premium Level 4 |

Analyzing various aspects of a communication environment.

---

420

Allocating one or more channels as power smart channels.

| Power saved (dB) | RB# = 2 | 3 | 4 | 8 | 10 |
|---|---|---|---|---|---|
| SINR = -3.0 | 0.5 | 0.6 | 0.7 | 0.8 | 0.8 |
| 0.0 | 0.8 | 1.1 | 1.2 | 1.4 | 1.4 |
| 3.0 | 1.4 | 1.8 | 2.0 | 2.3 | 2.4 |
| 4.8 | 1.8 | 2.3 | 2.6 | 3.0 | 3.0 |
| 6.0 | 2.1 | 2.7 | 3.1 | 3.5 | 3.6 |
| 7.0 | 2.4 | 3.1 | 3.4 | 4.0 | 4.1 |
| 7.8 | 2.6 | 3.4 | 3.8 | 4.4 | 4.5 |
| 8.5 | 2.8 | 3.7 | 4.1 | 4.7 | 4.8 |
| 9.0 | 3.0 | 3.9 | 4.4 | 5.0 | 5.1 |
| 9.5 | 3.2 | 4.1 | 4.6 | 5.3 | 5.4 |
| 10.0 | 3.3 | 4.4 | 4.8 | 5.5 | 5.7 |

Power Savings compared with one channel (1 RB) usage

FIG. 11

| PS | Mode |
|---|---|
| Ind10 | 10 |
| Ind9 | 9 |
| Ind8 | 8 |
| Ind7 | 7 |
| Ind6 | 6 |
| Ind5 | 5 |
| Ind4 | 4 |
| Ind3 | 3 |
| Ind2 | 2 |
| Ind1 | 1 |

FIG 13

METHOD AND SYSTEM FOR MOBILE DEVICE TO UTILIZE CHANNELS WITH LOW POWER CONSUMPTION

TECHNICAL FIELD

The present disclosure relates generally to the field of wireless communications and more specifically to the field of reduced power wireless communications.

BACKGROUND

A major concern of cellular phone users and cellular phone manufacturers is the limited battery life of conventional cellular phones. As cellular phones are manufactured with increasingly smaller form factors, their available space for a battery is also diminished. Meanwhile, conventional cellular phones and especially smart phones are also increasing their power requirements that may result in even further reductions of battery life. Such considerations for battery life are especially critical when the cell phone is away from a charging station (e.g., a user of a cell phone is on the move, at a restaurant, shopping mall, sporting event, etc.) or under certain special situations (e.g., emergency calls are required, the cell phone has a partially charged battery and will quickly drain the battery, etc.).

There have been several attempts to increase battery life. Such conventional solutions include multiple Media Access Control (MAC) states including a sleep mode, the use of an uplink control (a major cause of power draining may be due to power amplification needed for uplink transmission) to reduce power usage by reducing the need for high power transmission when the cellular device is close to a cell tower, and lastly, the desired power savings may be achieved by reducing the number of applications that may tax battery life. For example, to conserve battery life, WiFi, Bluetooth, GPS, and sync controls may be shut down. In addition, screen brightness may also be reduced or dimmed. A display screen may also be turned off when a "timeout" condition has been reached.

SUMMARY OF THE INVENTION

The present invention facilitates efficient and effective power management for wireless telecommunications. In one embodiment, presented approaches enable power savings in devices with a limited power supply (e.g., mobile devices operating on battery power supply, photocell, etc.). In one exemplary implementation, one or more power smart channels are used. Power smart channel transmission power levels are set relatively low (e.g., compared to conventional approaches, etc.) while still providing reasonable assurance that a sufficient signal will get from a transmitting component to a receiving component. In one embodiment, establishment and utilization of power smart channels is based upon various different considerations. In one exemplary implementation, power smart channels can be established based on various aspects of a communication environment (e.g., reduced/minimal interference, close location of components, multiple resource bands with a lower Adaptive Modulation and Coding (AMC) level, etc.), wherein the particular aspects of the power smart channel facilitate communication at lower power consumption. After a power smart channel is established, in one embodiment, the availability of the power smart channel for assignment and use by a particular mobile device can be impacted by various aspects of the mobile device (e.g., location of the mobile device, remaining power supply of the mobile device, etc.). Various business constraints (e.g., cost of providing different number of power smart channels, user payment for the power smart channel use, etc.) can also impact utilization of power smart channels.

In one embodiment, a power conservation method comprises: performing a power smart channel establishment process, wherein one or more power smart channels are configured with one or more power conservation mechanisms that facilitate conservation of power in communication transmissions; and performing a power smart channel communication process, including participating in a selection of at least one of the one or more power smart channels for communicating with a mobile device. The power smart channel establishment process can include: analyzing various aspect of a communication environment, including aspects that impact an ability to transmit communications at lower power levels; and configuring the one or more power smart channels based upon the results of the analyzing. There can be various power conservation or saving mechanisms (e.g., restriction on interference, allocating multiple resource bands to a power smart channel, a relay, etc.). The restriction on interference can be implemented in various manners (e.g., based upon prohibition of a resource band use in a neighboring cell, based upon a location of the mobile device, etc.). In one embodiment, one or more power conservation mechanisms can include restriction on interference with the power smart channel.

The power smart channel communication process can include: performing a power smart channel activation process; performing a technical qualification review process, including determining which of the one or more of the power smart channels are available; and performing an authorization review process, including determining if a mobile device complies with the results of the technical qualification review process. The power smart channel communication process can be based upon a priority associated with the mobile device (e.g., power reserve of batteries in the mobile device, payment of a fee, an emergency situation, etc.). A power smart channel can be associated with at least one power conservation or savings mode.

In one embodiment, a communication system comprises: a base station configured to establish one or more power smart channels that facilitate conservation of power in communication transmissions, wherein the one or more power smart channels are configured for communication transmissions at a power level lower than otherwise required to overcome distance and interference; and a mobile device operable in a plurality of power states, wherein at least one of plurality of power states is associated with communicating with the base station via the one or more power smart channels. Assignment of the one or more power smart channels to the mobile device can be based upon a location of the mobile device. In one exemplary implementation, a display included in the mobile device participates in a power conservation or savings mode selection, wherein a power savings mode indication is presented on the display and the power savings mode is associated with at least one of the one or more power smart channels for communicating between the base station and the mobile device. In one embodiment, a power smart channel can be configured for power transmission levels lower than other channels.

In one embodiment, a power conservation system comprises: a memory for storing information; and a processor for processing the information, including performing operations associated with power conservation including: participating in a power smart channel method including communicating via one or more power smart channels that that facilitate conservation of power in communication transmissions. Various operations associated with the participation in the power smart channel method can be performed by a various devices (e.g., mobile devices, base stations, etc.) The participation operations can depend upon the devices performing the operations. In one embodiment, a display included in the mobile device participates in a power savings mode selection, wherein a power savings mode indication is presented on the display and the power savings mode is associated with at least one of the one or more power smart channel for communicating between the base station and the mobile device.

Participating in a power smart channel method can include performing a power smart channel establishment process, wherein one or more power smart channels are established based upon various characteristics and features that facilitate conservation of power in communication transmissions; and Participating in a power smart channel method can include performing a power smart channel communication process, including participating in a selection of at least one of the one or more power smart channels for communicating with a mobile device. At least one of the characteristics that facilitate conservation of power in communication transmissions can include reservation of at least one channel, wherein the at least one channel is reserved with neighbors so that the neighbors do not transmit in the channel. The number of resource bands that are reserved as power smart channels can be based upon the number of mobile devices wanting to use the power smart channels and a traffic generation pattern. The features that facilitate conservation of power in communication transmissions can include joint transmitting/receiving on multiple power smart channels associated with a mobile device and combining signals/information communicated on the multiple power smart channels (e.g., in a mobile device, in a base station, etc.). In one exemplary implementation, the selection of a power smart channel for communicating with a mobile device is based on the distance of the mobile device from a base station.

BRIEF DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated. The present invention will be better understood from the following detailed description, taken in conjunction with the accompanying drawing figures in which like reference characters designate like elements and in which:

FIG. 1B is a table representing exemplary configuration of power smart channels in one embodiment.

FIG. 4 is a block diagram of a power smart channel establishment process in accordance with one embodiment of the present invention.

FIG. 11 is a table further illustrated example power reduction/savings in one embodiment.

FIG. 13 is a block diagram of an exemplary power saving mode reference table in accordance with one embodiment of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The present invention facilitates efficient and effective power management for wireless telecommunications. In one embodiment, presented approaches enable power savings or conservation in devices with a limited power supply (e.g., mobile devices operating on battery power supply, photocell, etc.). In one embodiment, power smart channel communications can be transmitted at lower power levels than conventional or normal channel communications. Presented power smart channel methods and systems can be implemented in a wireless cellular communication environment. It is appreciated that power smart channel approaches can be complex and complicated. A brief overview of one embodiment of a power smart channel approach is presented initially. Additional explanation of power smart channel power conservation approaches is set forth in later portions of the detailed description.

Figure 1A:
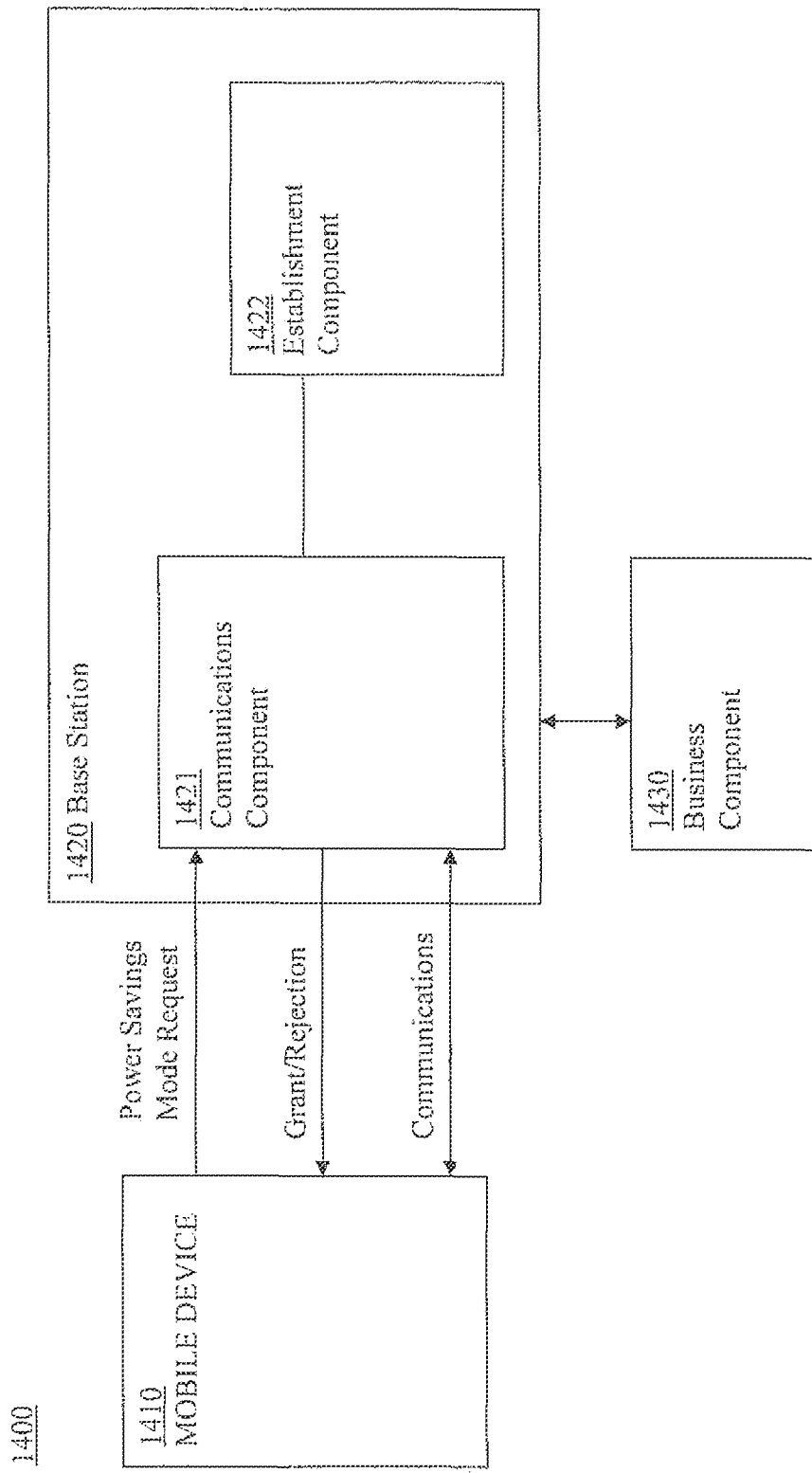
FIG. 1A is a bloc diagram of exemplary components utilized in a smart power communication process in one embodiment.

FIG. 1A is a block diagram of one exemplary power conservation system 1400 in accordance with one embodiment. Power conservation system 1400 includes mobile device 1410 and base station 1420. Base station 1420 includes power smart channel communications component 1421 and power smart channel establishment component 1422. The components of exemplary power conservation system 1400 cooperatively operate to facilitate power conservation in mobile device 1410. Power smart channel establishment component 1422 can configure power smart channels based on various aspects of a communication environment that facilitate communication transmissions at a lower power level (e.g., reduced/minimal interference, close location of components, multiple resource bands, etc.). In response to a trigger (e.g., a request, certain conditions, etc.) for mobile device 1410 to use a power smart channel, power smart channel communication component 1421 determines if a power smart channel established by establishment component 1422 is available and if mobile device 1410 qualifies for use of the power smart channel. Determining if a mobile device 1410 qualifies for use of the power smart channel can include examining aspects of the mobile device 1410 (e.g., the location, has user paid appropriate fees, etc.). If everything is approved, communications utilizing low power are implemented.

In one embodiment, power smart channel establishment component 1422 configures at least one power smart channel. As part of establishing the power smart channel, a power smart channel is configured with various characteristics and pre-requisites. FIG. 1B is a table representing exemplary configuration of power smart channels in one embodiment. The overview description is directed to configuration of power smart channels with various features and characteristics generally. Additional explanation of the power smart channel features and characteristics are set forth in later portions of the detailed description. Column 1510 includes power smart channel designations. The designations can be associated with various resource bands (e.g., radio bands, etc.). Column 1520 includes indications of a power conservation or saving mechanism a power smart channel utilizes to facilitate power conservation (e.g., interference restriction, multiple channels or resource bands, etc.). Column 1530 includes pre-requisites a mobile device needs to satisfy in order to use the corresponding power smart channel. Column 1540 includes indications of power savings modes associated with the power smart channel. Column 1550 includes indications of business requirements.

In one embodiment, establishment component 1422 establishes or configures the power smart channels identified in column 1510 (e.g., channel A, B, C, etc.) and determines the configuration (e.g., aspects, features, characterizations, etc.) as represented in the other columns (1520, 1530, etc.) respective entries. When mobile device 1410 triggers or requests use of a power smart channel, communications component 1421 checks with establishment component 1422 to determine if any power smart channels are available for assignment to the mobile device. Availability can be based upon a variety of factors (e.g., which if any power smart channels are not already in use, does a mobile device meet various pre-requisites for using the power smart channel, etc.). In one embodiment, base station 1420 can also coordinate with a business component 1430 (e.g., to determine if a user has paid for a power smart channel, what features have been paid for, etc.). In one exemplary implementation, if establishment component 1422 returns an indication of an available power smart channel (e.g., Channel A indicated in first row of column 1510, etc.) the communications component 1421 determines if the mobile device 1410 meets the pre-requisites (e.g., located close to base station and paid premium level 1 shown in first row of columns 1530 and 1550 respectively, etc.). If power smart channels are available and the mobile device 1410 meets various prerequisites, communications are commenced between the mobile device 1410 and base station 1420. Again, it is appreciated that power smart channel approaches can be complex and complicated. In general, the description includes brief overviews presented initially with additional explanation of power smart channel power conservation approaches set forth in later portions of the detailed description.

Figure 1C:
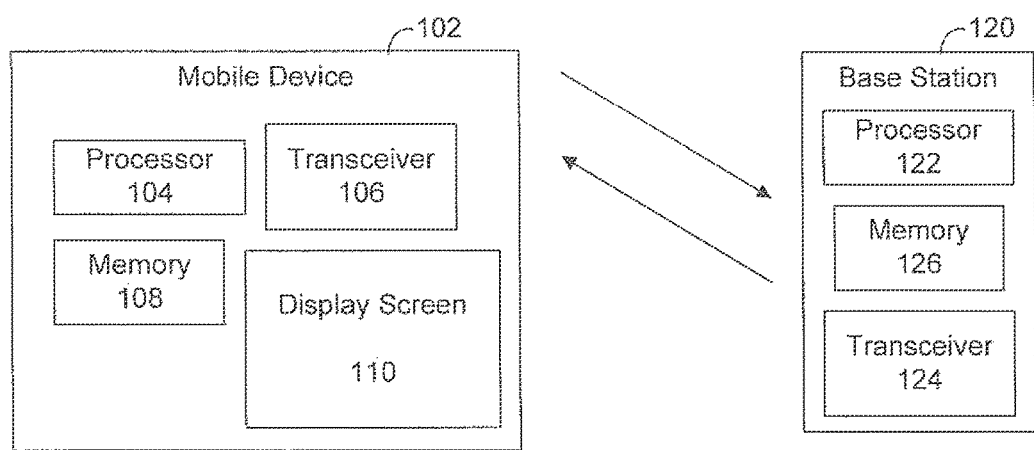
FIG. 1C is a block diagram of exemplary wireless telecommunication components in accordance with one embodiment of the present invention.

It is appreciated that presented approaches can be implemented in a variety of configurations and environments. In one embodiment, a power smart channel approach is implemented in a wireless telecommunication environment. FIG. 1C is a block diagram of exemplary wireless telecommunication components in accordance with one embodiment of the present invention. Mobile device 102 includes processor 104, memory 108, display 110, and transceiver 106. Base station 120 includes processor 122, memory 126, and transceiver 124. In one embodiment, mobile device 102 and base station 120 communicate with each other via transceiver 106 and transceiver 124 respectively. In one exemplary implementation, processor 104 of the mobile device 102 is configured to perform various operations in accordance with instructions stored in memory 108, and processor 122 of the base station 120 is configured to perform various operations in accordance with instructions stored in memory 126. Display screen 106 can operate as a user interface (e.g., display output, touch screen input, etc.). There can be other components (e.g., keyboards, speakers, communication ports, antennas, power supplies, batteries, etc.) that are not shown. The operations performed by processors 104 and 122 can include operations associated with communication between mobile device 102 and base station 120. The operations can include participating in a power conservation method or power smart channel method that utilizes a power smart channel approach. In one embodiment, the operations can include establishing one or more power smart channels based that facilitate conservation of power in communication transmission. Additional explanation of power smart channel approaches is set forth in later portions of the detailed description.

It is appreciated that presented smart phone approaches are compatible with a variety of wireless network configurations and components. Base stations can include various antennas (e.g., cell towers, etc.) and coverage areas may be configured in a variety of shapes (e.g., hexagonal, square, circular, etc.). Mobile devices can include various components (e.g., a cell phone, smart phone, other wireless user equipment, tablet, etc.).

Figure 2A:
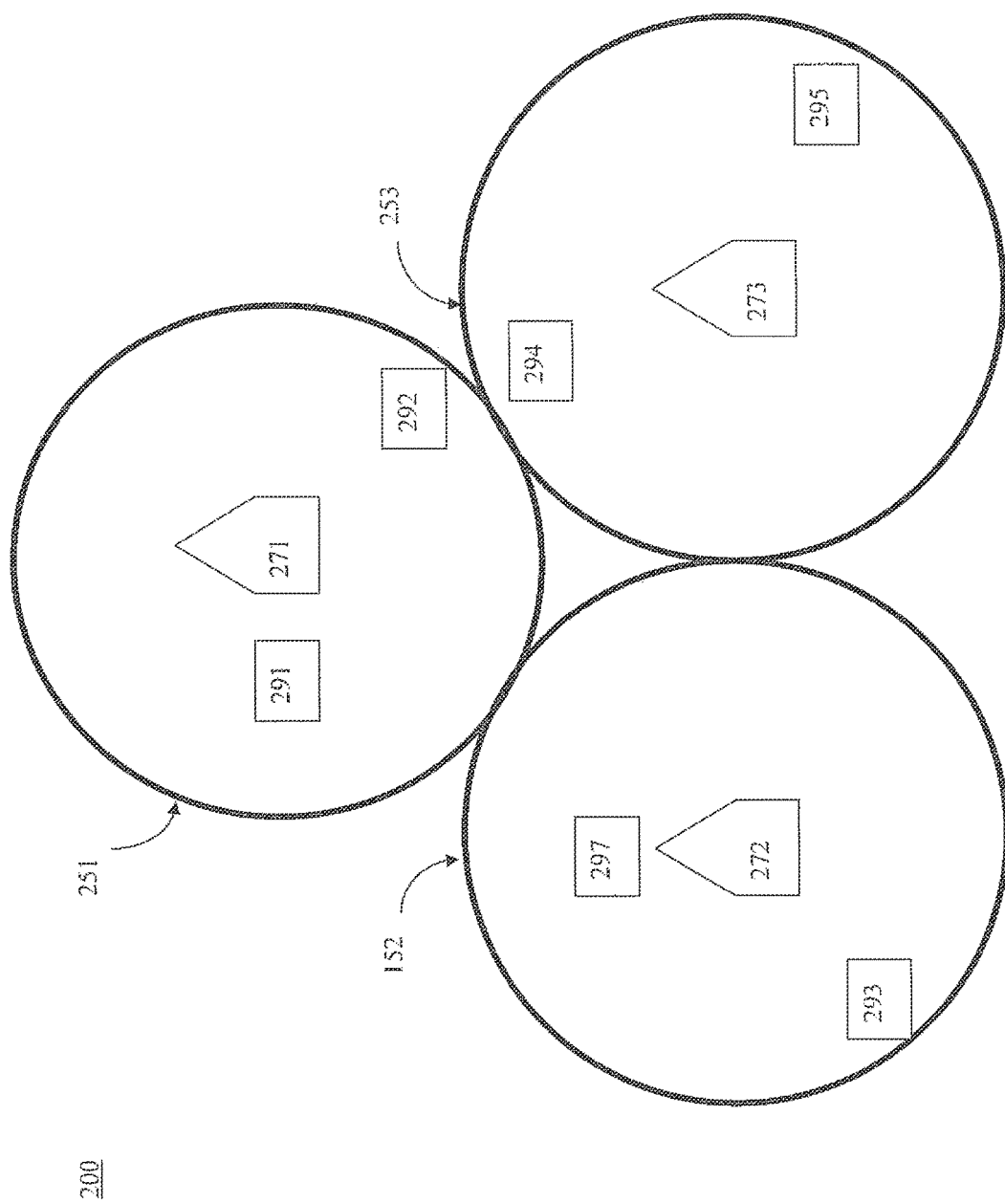
FIG. 2A is block diagram of an exemplary cellular telecommunication network environment in accordance with one embodiment of the present invention.

It is appreciated that mobile devices and base stations can be arranged in a variety of configurations. In one embodiment, the mobile devices and base stations can be included in a cellular telecommunications network. FIG. 2A is block diagram of an exemplary cellular telecommunication network 200 environment in accordance with one embodiment of the present invention. Cellular telecommunication network 200 includes a plurality of cells 251, 252, and 253. Each cell includes a respective base station (e.g., 271, 272, 273, etc.) and optionally at least one mobile device. In one exemplary implementation, cells are based primarily upon a coverage area and whether a mobile device is included in the cell depends primarily upon whether the mobile device is turned on and located in the cell coverage area. Cellular telecommunication network 200 can be configured such that mobile devices 291 and 292 are in cell 251 service area; mobile devices 293 and 297 are in cell 292 service area; and mobile devices 294 and 294 are in cell 253 service area. In one embodiment, each base station (e.g., 271, 272, 273, etc.) includes a cell tower with antenna that provides wireless communication coverage to mobile devices in a particular geographical area or location. In one exemplary implementation, a mobile device (e.g., 291, etc.) can communicate with a wireless network via a base station (e.g., 271, etc.) that communicatively couples to a mobile switching center (MSC), which in turn provides a communication connection to a public switched telephone network (PSTN) (not shown).

The cellular telecommunication network illustrated in FIG. 2A is compatible with presented power smart channel approaches. It is appreciated that power smart channel approaches can be dynamically and flexibly implemented in various and complex configurations. A simplified implementation is presented initially to provide an overview of one exemplary power smart channel approach without extensive possible complexity. Additional explanation of various complexities that can occur in a power smart channel approach is set forth in later portions of the detailed description.

Figure 2B:
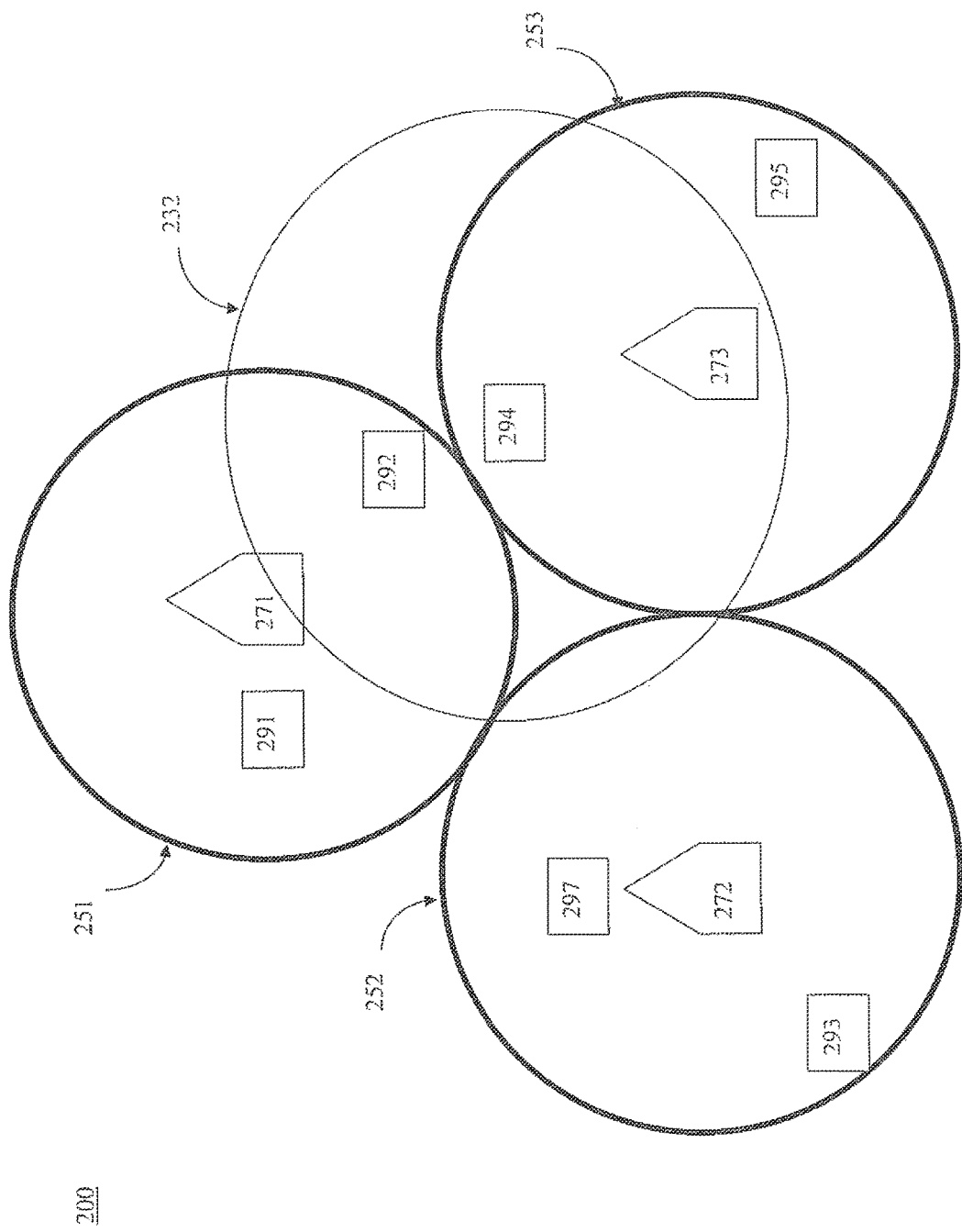
FIG. 2B is a block diagram of an exemplary cellular telecommunication network illustrating possible transmission overlap and possible interference between two mobile devices when a power smart channel is not utilized.

In one exemplary implementation, each cell of cellular telecommunication network environment 200 is capable of communicating on three channels A, B, and C. The channels can be utilized without configuration as a power smart channel. FIG. 2B is a block diagram of cellular telecommunication network 200 illustrating possible transmission overlap and possible interference between two mobile devices when a power smart channel is not utilized. In one exemplary implementation, the transmission interference pattern 232 from mobile device 294 on a channel (e.g., channel A) can interfere with transmissions between mobile device 292 to base station 271 if transmitting on the same channel (e.g., channel A) and that channel is not configured as a power smart channel.

In one embodiment, a cellular telecommunication network 200 can be configured to utilize at least one power smart channel. If the analysis of cellular telecommunication network or environment 200 also indicates cell 252 and 253 can and are willing to be configured to restrict/prevent use of channel A, the channel A is configured or allocated as a smart power channel in cell 251. The components in cells 252 and 253 are restricted or prevented from using channel A and therefore are less likely to interfere with communications of components in cell 251 using channel A. Given that the possibility of interference is less or none on channel A in cell 251, communications in cell 251 do not have to be as concerned with overcoming interference from other cells. Therefore, power levels associated with channel A in cell 251 can be reduced, resulting in power conservation or savings in components included in cell 251 (e.g., in batteries of mobile device 292, 291, etc.). In one embodiment, a base station may have several channels or resource bands configured for exclusive use in a cell by coordinating restriction or prohibition of use in other cells. Additional explanation of various complexities that can occur in a power smart channel approach is set forth in later portions of the detailed description.

When not utilized as a power smart channel, the power transmission level for a channel is set sufficiently high to reach the base station from anywhere in the coverage area and also overcome the possibility of interference from other mobile devices transmitting on the same channel. Therefore, when a channel is not allocated or not utilized as a power smart channel, a mobile component has to transmit at a relatively high power level and power savings are not realized. However, if a presented approach of assigning or allocating the channels as a power smart channel is utilized, a mobile component can transmit at a relatively low power level and power savings or conservation can be facilitated.

Figure 3:
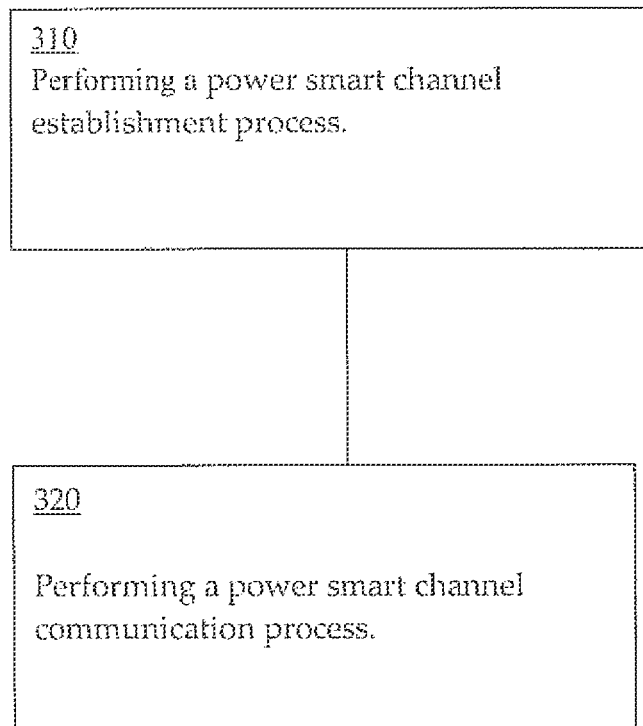
FIG. 3 is a block diagram of an exemplary power smart channel method in accordance with one embodiment of the present invention.

FIG. 3 is a block diagram of an exemplary power smart channel method 300 in accordance with one embodiment of the present invention. Power smart channel method 300 can be implemented in a variety of wireless communication environments and architectures. In one embodiment, a power saving approach is directed at least in part to conservation of a limited power supply (e.g., battery, low level solar, capacitive charge, etc.) available to a mobile device. In one embodiment, various components (e.g., mobile device, base station, etc.) can participate in or implement at least a portion of power smart channel method 300.

In block 310, a power smart channel establishment process is performed. In one embodiment, one or more power smart channels are established based upon various aspects of a network environment that facilitate conservation of power in communication transmission (e.g., the aspects can include configuration of components, features and characteristics of components, locations of components, interference properties, availability of resources, etc.). In one exemplary implementation, power smart channels are configured (e.g., similar to configurations shown in FIG. 1B, etc.). The power smart channels are wireless channels. Additional explanation of power smart channel establishment approaches is set forth in later portions of the detailed description.

In block 320, a power smart channel communication process is performed. In one embodiment, a power smart channel communication process includes participating in communications via a power smart channel. In one exemplary implementation, a power smart channel communication process includes selection of at least one power smart channel for communicating with a remote or mobile device. The mobile device can include a variety of components (e.g., cell phone, smart phone, tablet, etc.). In one exemplary implementation, a power smart channel may allow the same amount of bandwidth to be communicated for a reduced power expenditure or consumption (e.g., than a conventional approach, etc.). Additional explanation of power smart channel communication approaches is set forth in later portions of the detailed description.

FIG. 4 is a block diagram of a power smart channel establishment process 400 in accordance with one embodiment of the present invention. In one embodiment, a power smart channel establishment process 400 is similar to the power smart channel establishment process performed in block 310.

In block 410, various aspects of a communication environment are analyzed. The analysis can be focused on aspects that impact the ability of a channel to facilitate power conservation (e.g., location of a mobile device, interference, etc.). In one embodiment, the communication environment is a wireless cellular telecommunications environment and aspects within a particular cell are analyzed. The analysis can include determining the number of mobile devices within a cell, determining the location of the devices within a cell, determining interference likelihood, and so on. Aspects of another cell (e.g., neighboring cell, etc.) can also be analyzed. In one embodiment, the analysis includes participating in a neighboring cell coordination process. In one exemplary implementation, the neighboring coordination cell process includes an exchange of cell environment information between neighboring cells. The cell environment information can include an indication of a channel or resource band a cell is using, an indication of a channel or resource band a cell is able/willing to forego or restrict use of, an indication of the location of mobile devices in a cell, an indication of a channel that is less likely to cause interference issues, (e.g., based upon location of mobile devices, power transmission strength associated with the channel, etc.), and so on. Additional explanation of communication environment analysis approaches is set forth in later portions of the detailed description.

In block 420, a power smart configuration or allocation process is performed in which one or more channels or resource bands are allocated as power smart channels. In one embodiment, the power smart channels are allocated based upon the results of the analysis in block 410. In one exemplary implementation, a channel or resource band is configured or allocated as a power smart channel if the analysis in block 410 indicates the channel includes aspects that facilitate power conservation. A channel that is relatively assured to have reduced or minimal chance of adverse interference (e.g., a neighboring cell is configured not to use the channel, a mobile device associated with another cell using the channel is not located close to the bordering boundary of the cell, etc.) can be allocated as a power smart channel. In one embodiment, a channel or resource band is reserved as a power smart channel. In one exemplary implementation, the reservation can be implemented across multiple cells (e.g., a particular channel is reserved for use in one cell and prohibited in another cell, a particular channel is reserved for use by mobile devices within a designated distance of respective cell base stations, etc.). In one embodiment, a resource band includes radio bands. Various characteristics and features can be associated with an allocated power smart channel.

In one embodiment, as part of a power smart channel configuration or allocation process a power conservation mechanism is associated with a power smart channel allocated in block 420. A power conservation mechanism can include a mechanism by which a power smart channel facilitates power conservation. A power conservation mechanism can include: using a channel or resource band with facilitating restrictions (e.g. restrictions to areas that reduce likelihood of neighbor interference, use of channel or resource band that has a restriction or prohibition from use in other cells, etc.); using joint processing, utilizing a plurality of channels or resource bands, fast fading priority scheduling, relay through other mobile devices, and so on. In one exemplary implementation, a mobile device and base station communicating on a power smart channel participate in the power conservation mechanism associated with the power smart channel. It is appreciated that a power smart channel can be configured with more than one of the power conservation mechanisms. A mobile device and base station can participate in implementation of the multiple power conservation mechanisms in combination.

In one embodiment, as part of a power smart channel configuration or allocation process a prerequisite (e.g., particular configuration, feature, condition, location, battery level, etc.) is associated with a power smart channel allocated in block 420. The prerequisite can be utilized to implement power smart channel reservation for designated aspects. The reservation can be directed to various objectives, including providing a certain level of probability that a power smart channel is available to cope with or respond to the various aspects. A power smart channel can be reserved for: utilization based upon mobile device location, utilization based upon user authorization (e.g., paying a fee, etc.), utilization based upon remaining battery supply of a mobile device, and so on. In one exemplary implementation, a base station has 20 power smart channels, of which 2 are reserved for emergency situations, 5 are reserved for mobile devices with extreme power consumption issues (e.g., battery reserve less than 5%, etc.), 3 are reserved for a special type of user (e.g., users paying for even higher tier or power savings mode, etc.), 5 are reserved for mobile devices in particular areas or locations and 5 are left relatively open for negotiation. Additional explanation of power smart channel allocation approaches is set forth in later portions of the detailed description.

Figure 5:
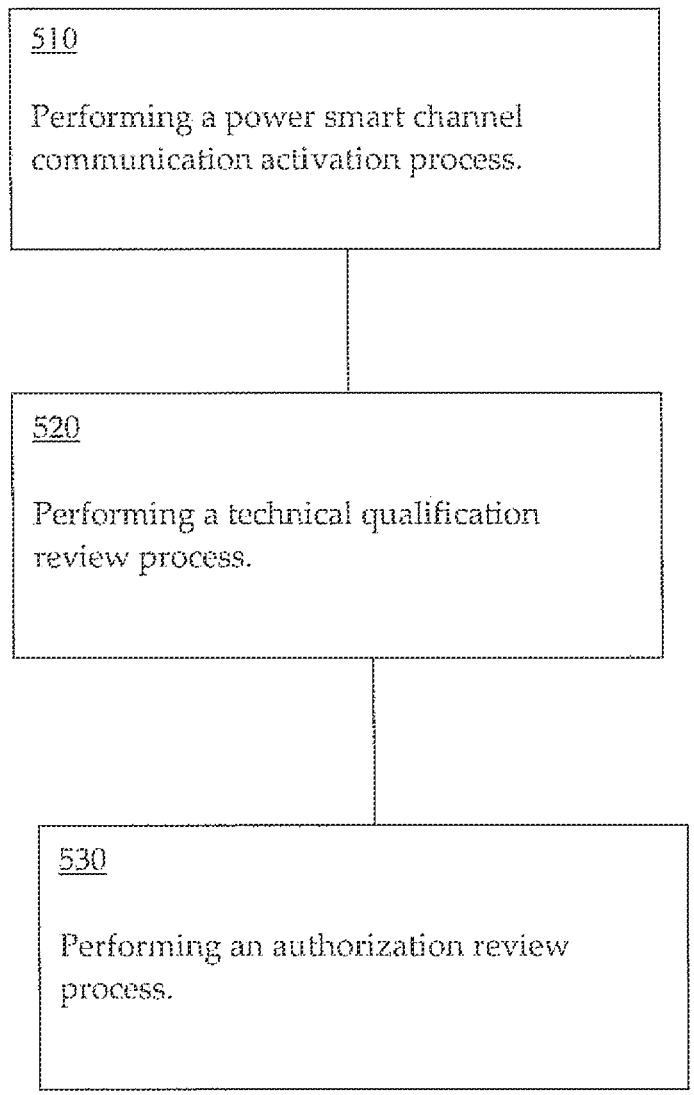
FIG. 5 is a block diagram of a power smart channel communication process in accordance with one embodiment of the present invention.

FIG. 5 is a block diagram of a power smart channel communication process 500 in accordance with one embodiment of the present invention. In one embodiment, power smart channel communication process 500 is similar to a power smart channel communication process of block 320. While one paragraph describing each block in process 500 is initially presented, additional explanation of power smart channel communication approaches is set forth in later portions of the detailed description.

In block 510, a power smart channel communication activation process is performed. In one embodiment, the power smart channel activation process includes user input. The power smart channel communication activation process can be initiated or trigger by user input (e.g., a user inputting: an indication of a desired power smart channel, an indication of a power conservation approach, an indication of a power savings mode, etc.). The power smart channel communication process can be initiated or trigger automatically. In one exemplary implementation, as part of an initial registration process upon entering a particular cell, a power smart channel activation process can be triggered or initiated automatically. The power smart channel activation process can be initiated automatically if a particular condition arises (e.g., a mobile device battery runs below a particular threshold or limit, a mobile device is moved to a particular location or range, etc.).

In block 520, a technical qualification review process is performed. In one embodiment, an analysis is made if any power smart channels are available for utilization. The analysis can include determining if any channels allocated as power smart channels (e.g., similar to block 320, etc.) are not being used and are available. The analysis can include examining what kind of power smart channel is available (e.g., what kind of power conservation mechanism is associated with the power smart channel, is the channel a single channel, a plurality of channels or resource bands allocated to a power smart channel, etc.). The analysis can include determining if there are particular constraints or prerequisites on the power smart channel. The constraints on the power smart channel can include: priority scheme restrictions; allocation for use by mobile devices located within a particular portion of a cell coverage area; the power smart channel is reserved for mobile devices experiencing particular power issues (e.g., restricted power supply, low battery, etc.); and so on.

In block 530, an authorization review process is performed. It is appreciated the mobile device authorization review process can include a variety of different considerations. In one embodiment, the authorization review process includes determining if a mobile device or end user meets or is compatible with the technical qualification results of block 410 (e.g., is in a particular location or range, is experiencing particular power issues, etc.). In one exemplary implementation, the authorization review process includes determining if a mobile device or end user has a business based authorization (e.g., has paid for access to the smart power channel options, not exceed a power smart channel usage limitation, etc.). In one embodiment, if a mobile device satisfies or passes an authorization review process the mobile devices is authorized to utilize the power smart channel. Additional explanation of authorization review approaches is set forth in later portions of the detailed description.

While the present invention is described primarily with respect to cellular wireless environment with mobile devices, it is appreciated that presented power smart channel approaches can be readily implemented in a variety of wireless environments with remote devices. It is also appreciated that presented power smart channel approaches can be implemented in numerous variations and complexity as set forth in following portions of the detailed description. The explanation of possible variations and complexities is not an exhaustive listing of all possible variations and complexities so as to not unnecessarily obfuscate the invention. While a variation or complexity may be explained separately, it is appreciated that they can be combined in various implementations of a presented power smart channel approach.

In one embodiment, a power smart channel method includes determining resources that are available. The determination can be made as part of a power smart channel establishment process (e.g., similar to block 210, method 300, etc.). In one exemplary implementation, the number of possible channels included in a cell are limited. For example, in one exemplary implementation of a cellular telecommunications network (e.g., 200 in FIG. 2, etc.) there are three possible channels available (e.g., Channels A, B, and C). As also shown in FIG. 2, there are two mobile devices in each cell 251,252, and 253.

In one embodiment, a power smart method involves balancing of various objectives. The balancing can be directed towards providing increased overall performance. In one exemplary implementation, the objectives by themselves may appear to be conflicting, however, balancing implementation of features associated with the objectives (e.g., balancing use of resources for particular power smart channel implementations in a cell versus keeping resources available for more general channel use, etc.) can be directed to coordinating overall results. Some exemplary power smart channel approaches described herein can be directed to facilitating increased power savings (e.g., lower transmission power, conservation of power supplies, etc.) and presented approaches can include balancing that objective against other aspects (e.g., impacts of reducing cell capacity maximization, etc.).

Some presented embodiments may be considered to go somewhat against conventional design principles of channel design and scheduler design. Conventional designs may be directed to prioritizing some aspects of user equipment performance without regard for power conservation (e.g., emphasizing speed or output without concern for power usage, etc.) and cell capacity maximization (e.g., maximum number of mobile devices in a cell, etc.). However, allocating resources for a power smart channel (e.g., reserving for particular mobile device location, using multiple resource bands, etc.) can result in impacts on other items (e.g., cell capacity maximization, etc.). It is appreciated that presented approaches can include balancing various objectives and impacts.

In one exemplary implementation, the balancing is directed to providing sufficient power smart channel capabilities while considering impacts on mobile device capacity for each cell. With reference to an example illustrated in FIG. 2, if there are no restricted channels (e.g., no channels allocated for power smart channel operation, etc.), the maximum number of mobile devices in each cell is three (e.g., one mobile device for each channel A, B, and C). However, if channel A is reserved for power smart operations in cell 251 and prohibited form use in cell 253, then cell 253 can not accept any more mobile devices until one of the mobile devices 294 or 295 finish on cell 253. In one embodiment, balancing is implemented by a power smart channel establishment process. The power smart channel establishment process can include negotiating or resolving an appropriate amount of channels a cell can permit to be restricted for use by another cell as a power smart channel. The resolution can be implemented in a variety of ways. A static limit or amount of channels that are available can be set (e.g., a cell establishes a particular number of power smart channels and the quantity does not change, etc.). A dynamic limit or amount of channels that are available can be implemented (e.g., the number or quantity of power smart channels is updated or changed to respond to changing network environment conditions, etc.).

The amount of channels or resource bands a cell can offer for restriction can be limited by the amount of power smart channels that particular cell is implementing. For example, if a cell has maximum capacity of 5 channels but has configured 2 for power smart channels use, the cell may limit the amount of channels it is willing to restrict usage on to the remaining 3 channels. The amount or target of available channels can be dynamic. In one exemplary implementation, a cell can have a maximum of 50 channels with a target of maintaining 5 open or free channels for new mobile devices. If 30 channels are currently being used and 5 are being kept open for new devices then 15 channels are available for restriction. If 3 new mobile devices enter the cell for a total of 33, the cell can reduce the number of channels that are available for restriction to 12 (e.g., entering restriction renegotiation with cells that were previously permitted to use the 3 channels as power smart channels, etc.).

In one exemplary embodiment, for each category of channels, knowing aspects of the environment (e.g., the number of actual or likely power smart channel users, their arrival rates and their load, etc.) helps in analysis regarding keeping a certain amount of resources exclusively for actual or likely power smart channel users. In one embodiment, during the admission of new calls these resources are not taken into account. The number of allocated power smart channels may be dynamically adjusted based upon a quantity of mobile devices using power savings modes and power savings mode requests. In one embodiment, to admit more power savings mode users, some guard band may be used during admission of new calls. As discussed herein, if a power smart channel in not available (e.g., all established power smart channels being used, none left that a particular mobile device qualifies for, etc.) a process to increase the number or power smart channels may be performed.

In one embodiment, the number of power smart channels can be adjusted by adjusting the resources allocated to a particular power saving channel. In one exemplary implementation, 8 channels or resource bands allocated to a particular power saving channel A can be adjusted to allocating 4 of the channels or resource bands to a new particular power saving channel B, allocating 2 of the channels or resource bands to a new particular power saving channel C, allocating 2 of the channels or resource bands to a new particular power saving channel D, thereby replacing channel A with channels B, C and D and effectively increasing the established power smart channels by 2. In one exemplary implementation, the new power smart channels have less resource bands and may not realize as much power conservation as channel A with 8 resource bands and a balancing of having more power smart channels each at slightly higher power consumption or one power smart channel at lower power consumption can be performed.

It is appreciated that these changes in establishment of power smart channels can by performed dynamically. The changes can also be performed in accordance with a variety objectives. In one embodiment, if a higher priority user requests a power smart channel, the power smart channel may be made available to the higher priority user by dynamically reducing the resources that may have been provided/assigned to other lower priority users. The number of power smart channels can depend on the number of mobile devices wanting to use power smart channels as well as their traffic generation patterns.

Of course this does not mean that other traffic cannot use these resources (e.g., as discussed herein, reserved power smart channel resources may be used by other users when they are not used by a mobile device in a power savings mode, etc.). The scheduler may also use the allocated low power channels for non-power savings mode users when power savings mode user requirements are low (e.g., power savings mode users are not using all of the allocated low power channels, etc.).

It is appreciated that a power smart channel can be configured with a power conservation mechanism to facilitate communication transmission at a lower power level. It is also appreciated a variety of power mechanisms can be implemented (e.g., interference restriction, multiple channels (RB), relays, joint processing, fast fading priority, etc.). Additional explanation of power conservation mechanisms is set forth in following portions of the description With respect to interference restriction power conservation mechanisms, it is appreciated there are various different approaches. In general, interference restriction power conservation mechanisms include a feature or characteristic that reduces or limits the likelihood that there will be an impact associated with interference on the communication. In one embodiment, a restriction of channel use in a neighboring cell reduces interference in the local cell and restriction to mobile device that is located close to base stations reduces interference in local cell (and also in the neighboring cells, etc.). In one exemplary implementation, the is a balancing or comparison of impacts and costs corresponding to different power smart channels with different power conservation mechanisms. While impact or costs analysis results for a particular location may indicate a preference for a particular power smart channel and power conservation mechanism, it is appreciated that in one embodiment a system or method is not limited or required to follow the results (e.g., power smart channels and power conservation mechanisms other than those indicated by the analysis results can be utilized, etc.).

Figure 6:
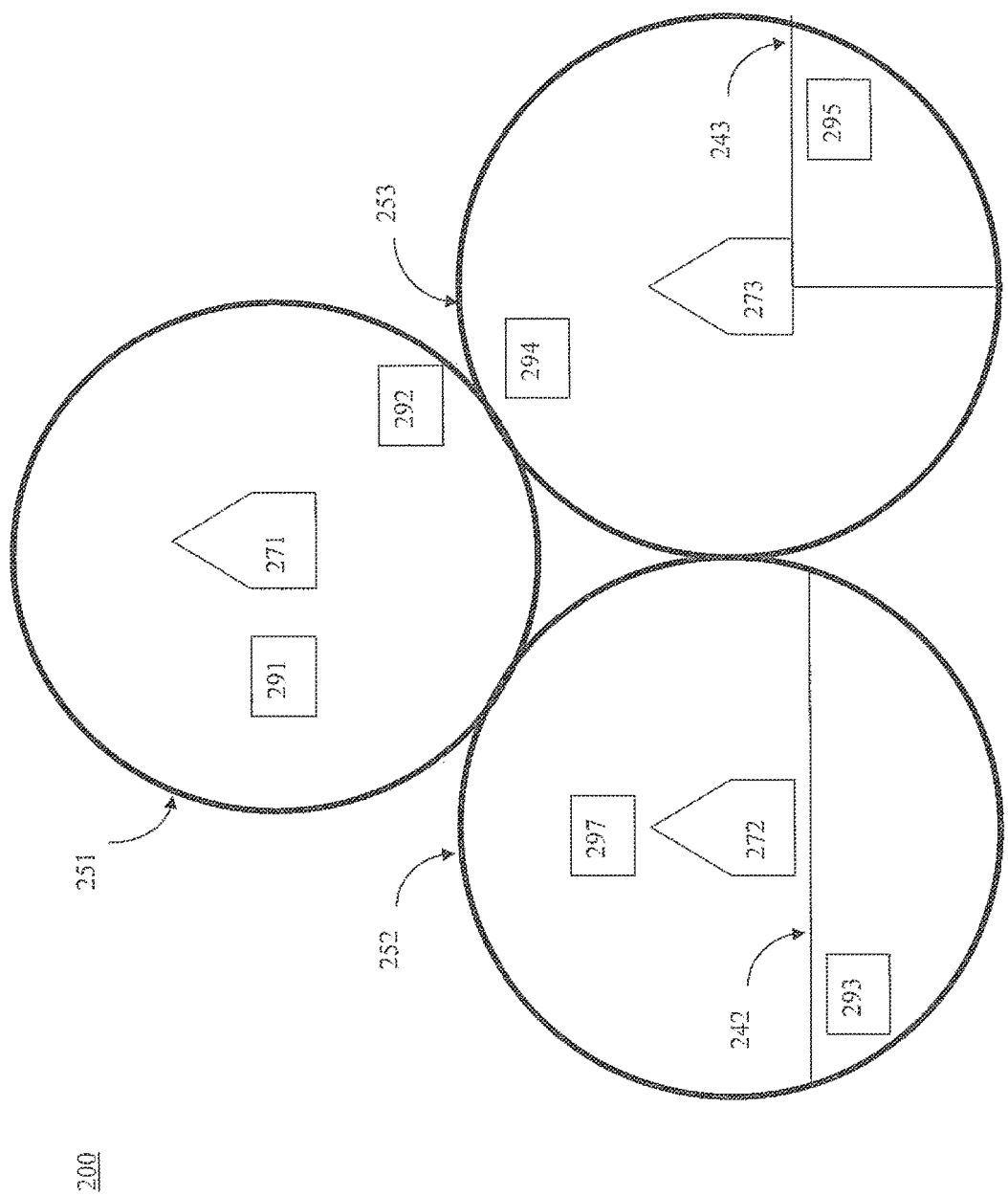
FIG. 6 is a block diagram of an exemplary cellular telecommunication network where utilization of a channel is permitted in one portion of a cell coverage area and restricted in another portion of the cell coverage area.

In the prior example (e.g., illustrated in FIG. 2A), when channel A is allocated as a power smart channel in cell 251, use of channel A was restricted or prevented in the cells 252 and 253. As set forth previously with respect to the position or location of mobile device 294 in cell 253 of FIG. 2, the position or location of a mobile device in a cell can impact the potential for interference with neighboring cells. The likelihood or probability of interference from components in a neighboring cell can depend on the location of the components in neighboring cell and the transmission power level. In one embodiment, rather that restrict use of channel A in the entire coverage area of a local cell (e.g., 252, 253, etc.), utilization of a channel is restricted in coverage areas where use has a likelihood of interfering with a neighboring cell (e.g., cell 251), while utilization of the channel is permitted in other coverage areas of the local cell (e.g., 253, 254, etc.). FIG. 6 is a block diagram of cellular telecommunication network 200 where utilization of a channel is permitted in one portion of a cell coverage area and restricted in another portion of the cell coverage area. In one exemplary implementation, a mobile device (e.g., 293, 295, etc.) can be included in a cell (e.g., 252, 253 respectively) in a position where transmissions from the mobile device is not likely to interfere with mobile devices (e.g., 292 and 291) in another cell (e.g., 251). A particular power smart channel (e.g., channel A) that is used in a one cell (e.g., 251) can be restricted in one part or region of a neighboring cell (e.g., cells, 252, 243, etc.) and permitted in another part or region (e.g., 242, 243, etc.) of the neighboring cell. Thus, a use of a channel (e.g., channel A) can be restricted for mobile devices (e.g., 294) located in a certain portion of the cell coverage area and not restricted for mobile devices (e.g., 295) located in another portion of the cell coverage area.

Figure 7:
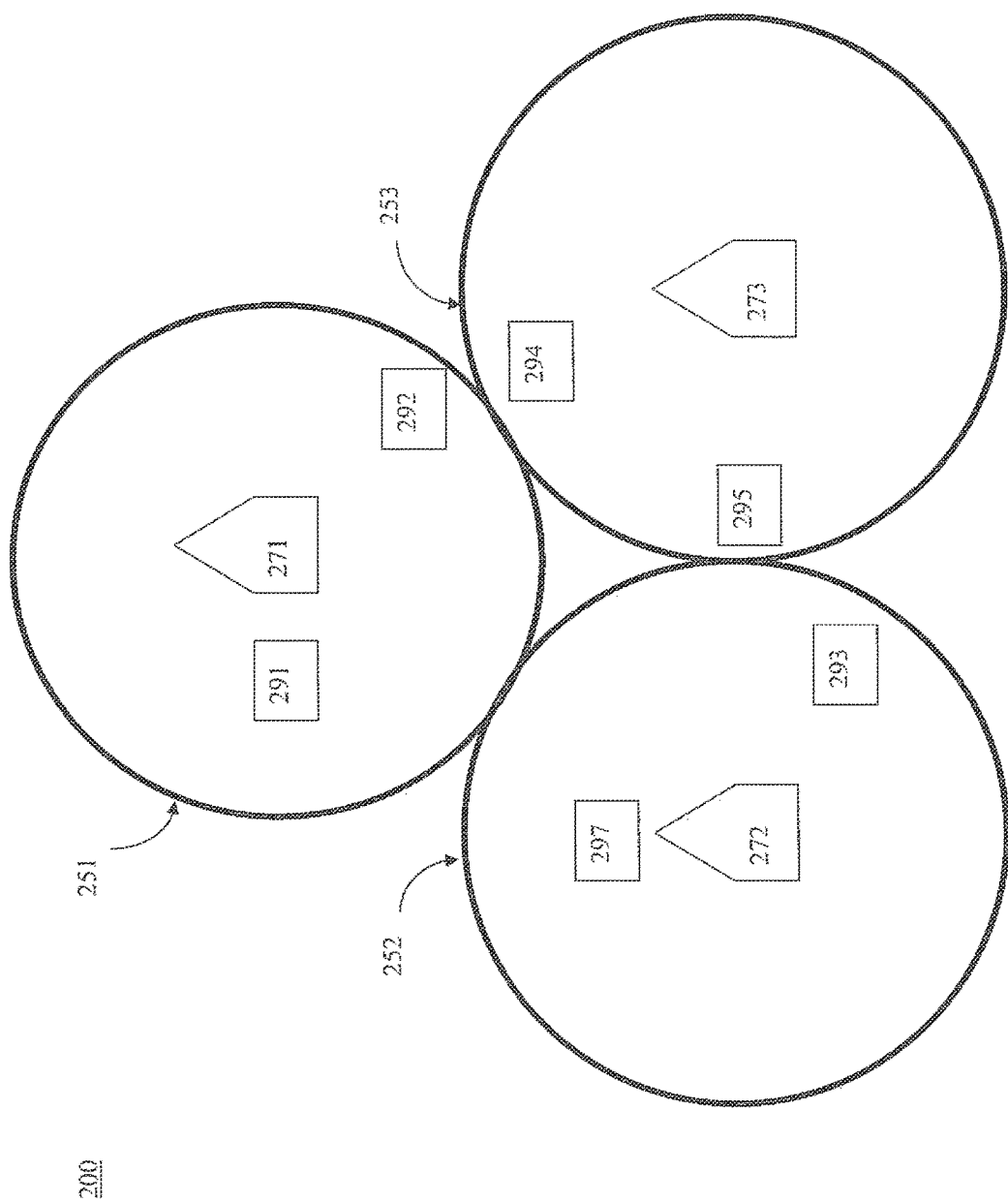
FIG. 7 is a block diagram of an exemplary cellular telecommunication network where mobile devices have changed locations.

It is appreciated that the position or location of a mobile device may change. For example, FIG. 7 is a block diagram of cellular telecommunication network 200 where mobile devices 293 and 295 have changed locations. In one embodiment, a power smart channel establishment process (e.g., block 310, process 400, etc.) adjusts power smart channel allocations in accordance with mobile device location changes. In one exemplary implementation, while mobile devices 293 and 295 were allowed to communicate on channel A when in the locations shown in FIG. 6, mobile devices 293 and 215 are restricted or not allowed to communicate on channel A in the location shown in FIG. 7. The power smart channel establishment process changes the allocation of channel A as a power smart channel in at least one of or both the cells 252 or 253. The power smart channel establishment process can remove the channel A power smart channel allocation in both. The power smart channel establishment process can permit one cell (e.g., 252) to continue to utilize channel A as a power smart channel while changing one of the mobile devices (e.g., 295) to another channel (e.g., channel C) and restricting or preventing use of the channel A in one of the cells (e.g., 253).

Figure 8:
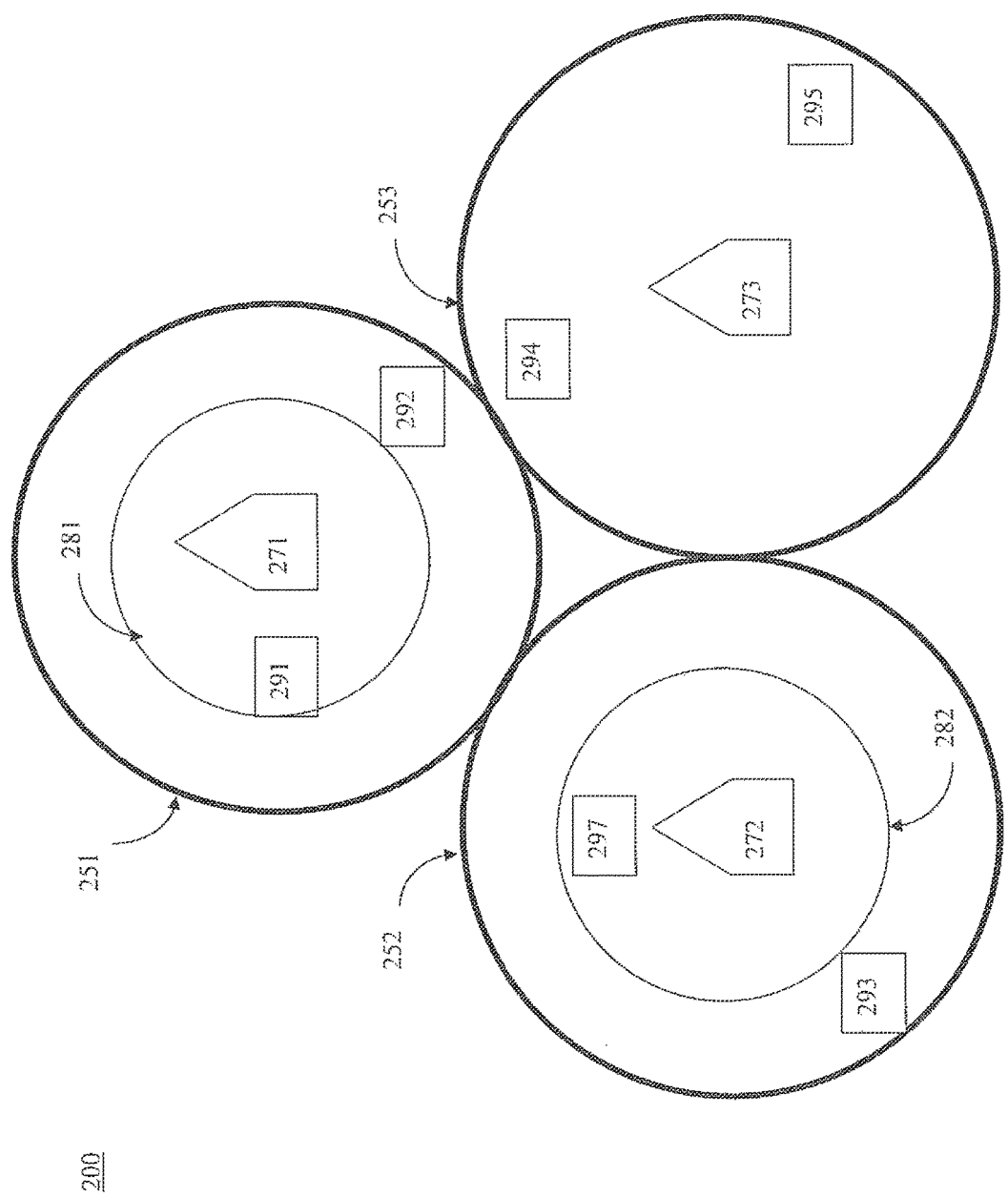
FIG. 8 is a block diagram of an exemplary cellular telecommunication network in which a power smart channel establishment process allocates a power smart channel for mobile devices located close to the base station.

A power smart channel establishment process (e.g., 400, etc.) can establish power smart channels for mobile devices that are located close to a base station. FIG. 8 is a block diagram of a cellular telecommunication network 200 in which a power smart channel establishment process allocates a power smart channel for mobile devices located close to the base station. In one embodiment, power smart channel establishment process can allocate a power smart channel (e.g., channel C) for mobile devices (e.g., 291, 297, etc.) in a close coverage area (e.g., 281, 282, etc.). A lower power communication channel can be utilized as less power from a mobile device is needed for the signal to reach the base station (e.g., the proximity according to radiometric dissipation 1/r2, etc.) and also since mobile devices in other cells can similarly restrict power transmission on the channel there is less likelihood of interference. For example, cells 251 and 252 can allocate channel C as a smart power channel using reduced power. Thus, mobile devices 291 and 297 located in coverage areas 281 and 282 respectively can transmit on low power channel C with reduced or no likelihood of interfering with one another or other components in other cells. In one embodiment, the wireless network or base station informs a mobile device of the closest locations where more power savings can be achieved, then mobile device user can move to that location.

Because different areas of neighboring base stations interfere differently, neighboring base stations may apply an interference limit to different channels, by for example, scheduling those mobile devices further way from the base station which requires a low power channel. During such scheduling, the power savings mode users may be given a higher priority for up-fades. In one embodiment, instead of using a highest Adaptive Modulation and Coding (AMC) level possible with an estimated signal to noise interference ratio (SNIR), a given mobile device may use multiple channels (RBs) with a lower AMC level (and a lower power level required of the mobile device). In one exemplary embodiment, multiple base stations may receive and combine a received signal from a mobile device.

In one embodiment, a power conservation mechanism can include restriction on interference with a power smart channel, wherein the power conservation mechanism facilitates reduction of interference received from other sources. In one scenario, the other sources can include mobile devices from another cell that do not have any authorization to transmit on a power smart channel in the cell. In another scenario, the other sources can include mobile devices from another cell that do not have authorization for full transmission (e.g., less than power level, restricted to a location within a cell, etc.) on a power smart channel in the cell. Exemplary implementations of reduced interference received from components in other cells is described in the following paragraph, wherein the other cells can have a complete restriction of communications on a channel, or a partial (e.g., location based, etc.) restriction on a channel.

In one exemplary implementation, mobile devices are prohibited or not authorized to transmit on a power smart channel in another cell. For example, with reference to FIG. 2B, if Channel A is established as a power smart channel in Cell 251 and use of Channel A is prohibited in Cell 253 and mobile device 292 is authorized to use Channel A in cell 251, then the possibility of interference received by mobile device 292 from another source (e.g., mobile device 294) not authorized to transmit on Channel A is reduced or eliminated (e.g., since mobile device 294 is in Cell 253 and use of Channel A in Cell 253 is prohibited, etc.). As indicated above with reference to FIG. 8, in one embodiment rather than a complete restriction or prohibition on a channel, there can be a partial or location based restriction on the channel use within a cell. A mobile device 291 can be authorized to communicate on a Channel C in cell 251, but the power level is restricted to a much lower level (e.g., a power level associated with coverage area 281, etc.). A mobile device 297 can be authorized to communicate on a Channel C in cell 252, but again the power level is restricted to a much lower level (e.g., a power level associated with coverage area 282, etc.). In one embodiment, mobile device 297 is considered another source not authorized to communicate on a Channel C in cell 251, (even though mobile device 297 is considered authorized to communicate on Channel C in cell 252). The possibility of interference received by mobile device 291 from another source (e.g., mobile device 297) not authorized to transmit on Channel C (e.g., at full power, etc.) is reduced or eliminated (e.g., since mobile device 297 is in Cell 252 and not authorized to transmit a power level strong enough to interfere with devices in coverage area 281 of Cell 251 such as mobile device 291, etc.).

Figure 9:
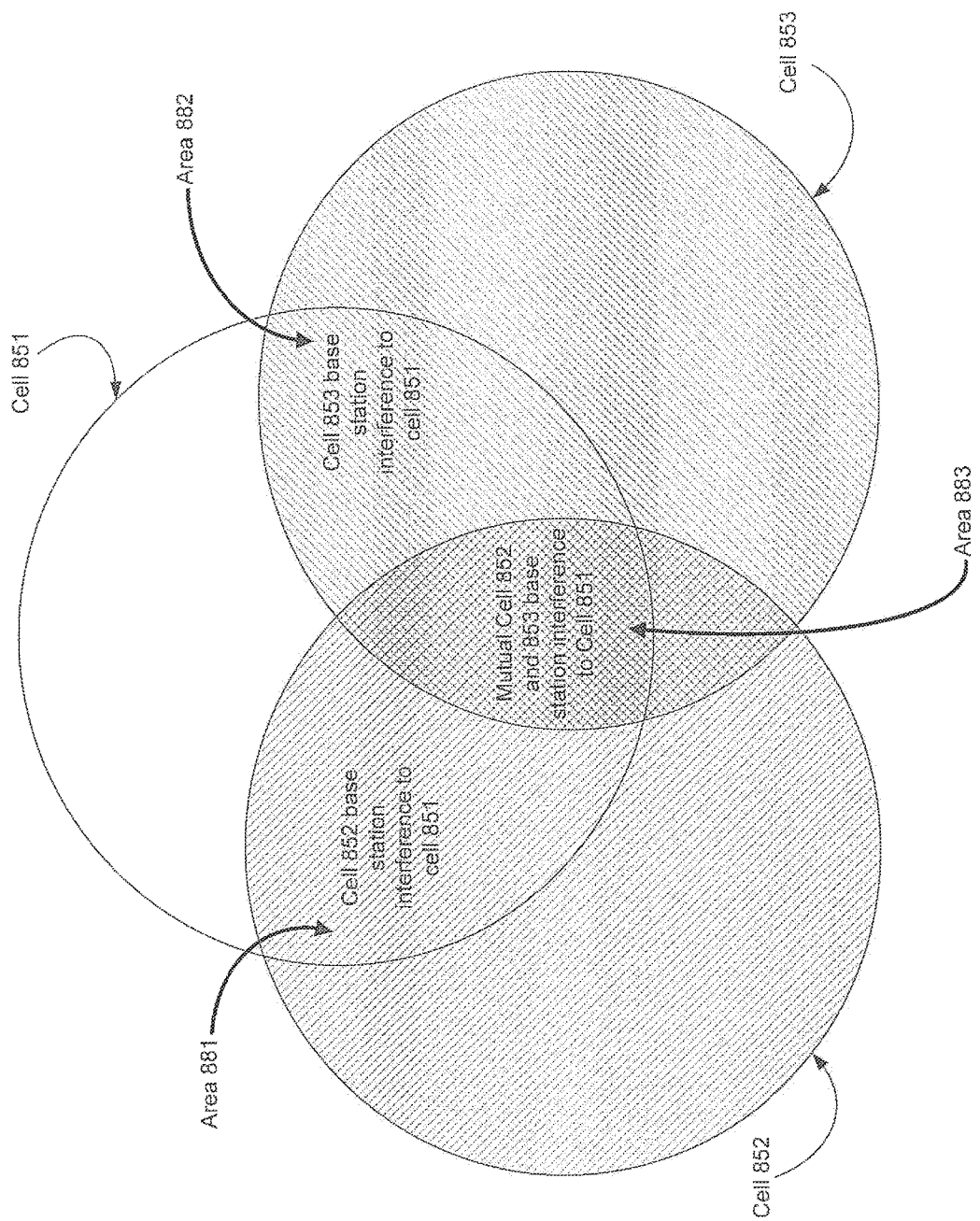
FIG. 9 is a block diagram of one exemplary overlapping cell configuration in accordance with one embodiment.

In one embodiment, cell coverage areas actually overlap slightly. FIG. 9 is a block diagram of one exemplary overlapping cell configuration in accordance with one embodiment of the present invention. The channel interference patterns and arrangements illustrated in FIG. 9 are for illustrative purposes only and are not drawn to scale or for a particular interference pattern or cell tower arrangement. The network in FIG. 9 includes cells 851, 852 and 853. As illustrated in FIG. 9, there is a coverage area 883 in which base stations from both cell 852 and cell 853 base stations are likely to cause a high probability of interference with cell 851 communications. In one exemplary implementation, power smart channels for cell 851 in this coverage area 883 are channels cell 852 and cell 853 shut down or reduced power to. As also illustrated in FIG. 9, there is a coverage area 881 where only cell 852 base station interferes (and not cell 853 base station). In one exemplary implementation, power smart channels for cell 851 in this coverage area 881 are channels cell 852 shut down or reduced power to. Correspondingly, there is also a coverage area 882 where only cell 853 base station interferes (and not cell 852 base station). In one exemplary implementation, power smart channels for cell 851 in this coverage area 882 are channels cell 853 shut down or reduced power to.

In one embodiment, the system can maintain a mobile device location-based database. In one exemplary implementation, for each particular location or area within a given cell coverage area, the system creates different levels of power savings (e.g., by changing neighboring power levels appropriately, etc.). The database can also store associated resource costs for the different levels. It is also possible that a mobile device's location may be considered a "bad" location where there is not much more that can be done to reduce the power requirements.

Figures 10A, 10B:
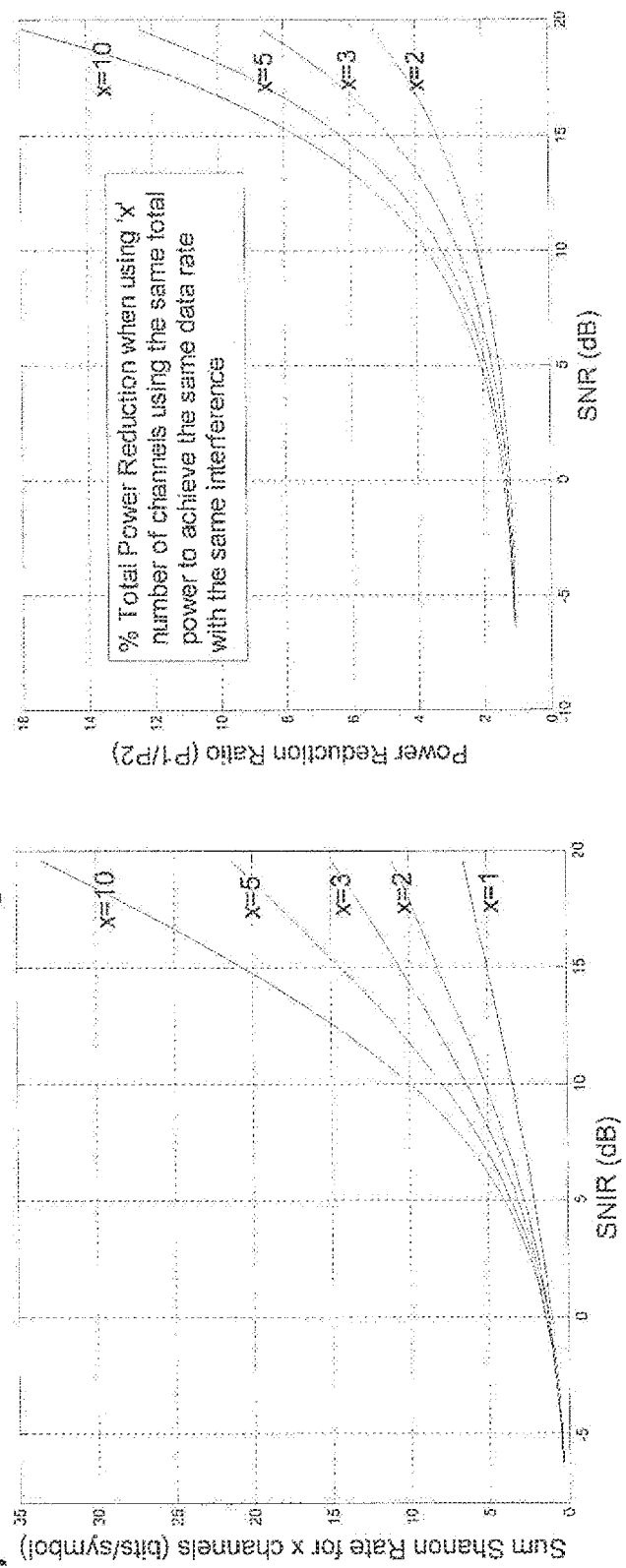
FIG. 10A is a graph illustrating exemplary increases in data rate as a function of a quantity of channels provided to a mobile device in one embodiment.
FIG. 10B is a graph illustrating exemplary power reduction ratios as a function of a quantity of channels provided to a mobile device in one embodiment.

In one embodiment, a power smart channel allocation includes multiple channels or resource bands (RBs). In one exemplary implementation, two or more channels or resource bands (e.g., channel A and B, etc.) are allocated to a power smart channel designation. For example, channels A and B can be allocated to power smart channel K and a mobile device "operating" on power smart channel K can really be transmitting on two channels or resource bands A and B (e.g., in parallel, substantially simultaneously, etc.). Uplink power may be reduced by using multiple RBs and by reducing Modulation and Coding Scheme (MCS). FIGS. 10A and 10B are graphs illustrating indications of exemplary power consumption savings associated with using multiple channels or resource bands for power smart channel allocation in accordance with one embodiment of the present invention. FIG. 10A is a graph illustrating exemplary increases in data rate as a function of a quantity of channels provided to a mobile device in one embodiment. In the example illustrated in FIG. 10A, the same total power level is utilized and has the same level of channel interference. FIG. 10B is a graph illustrating exemplary power reduction ratios as a function of a quantity of channels provided to a mobile device in one embodiment. As illustrated in FIG. 10B, for a given data rate a required power level may be reduced (e.g., by a factor of 15 at an SNIR=20 dB, etc.) if multiple channels are used. The power reduction/savings is further illustrated in FIG. 11. FIG. 11 is a table illustrating exemplary power savings of multiple channel (multiple RBs) compared with one channel (1 RB) usage, such that available bandwidth (of a base station) may be traded to provide dramatically improved power savings/conservation. In one embodiment, a mobile device's battery life may be increased by up to 15 times when using multiple channels (e.g., if frequency selective gain is not dropped, etc.).

As described herein, uplink transmit power may be reduced by using multiple RBs and a reduction in MCS. In one embodiment, the use of multiple RBs for a same data rate may reduce the required power requirements of a mobile device but at an additional system capacity expense. Such reduced system capacity may be partially recovered as adjacent base stations get low interference (e.g., if the power savings user is not a cell center user, etc.). Further, the adjacent base stations may also use the same channels for their own power saving users, because of the low interference they would have. Such techniques could be implemented locally (e.g., changing the uplink scheduler, etc.). In one exemplary implementation, using two RBs at high SNIR saves about four times the battery life (e.g., when transmit power is considered, etc.). Such techniques may be very attractive when the cellular system is not fully utilized (e.g., the number of mobile devices in a cell rarely or never reaches the maximum possible capacity, etc.).

Figure 12:
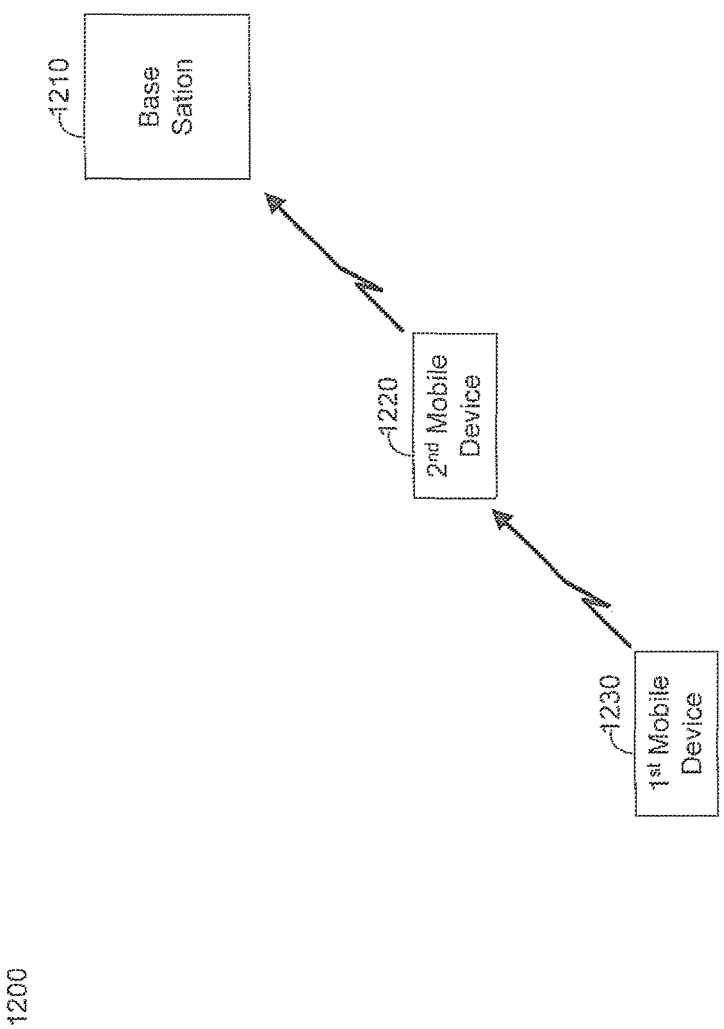
FIG. 12 is a block diagram of an exemplary cell in accordance with one embodiment of the present invention.

In one embodiment, a mobile device may be used as a relay connection to facilitate transmission power reduction in another mobile device. The use of a mobile device as a relay connection can be implemented on an ad hoc basis. FIG. 12 is a block diagram of exemplary cell 1200 in accordance with one embodiment of the present invention. As illustrated in FIG. 12, a first mobile device 1230 may relay a data transmission through a second mobile device 120 to base station 1210. Given the proximity of the components, the power utilized for the first mobile device 1230 to transmit to the second mobile device 1220 are lower than the power requirements necessary for the first mobile device 1230 to transmit directly to the base station 1210. In one embodiment, both the primary or initiating mobile device 1010 and the second mobile device 1220 (e.g., providing the ad hoc relay, etc.) can transmit on power smart channels. In one embodiment, mobile devices 1210 and 1220 transmit on the same channel and in another embodiment mobile devices 1210 and 1220 transmit on a different channel. One mobile device can be used as a relay to help its neighboring mobile device with the capability of supporting the power smart channels. In one embodiment, a power smart channel method is also compatible with a use of a conventional fixed relay.

In one embodiment, a power smart channel communication process (e.g., block 320, method 500, etc.) is performed in accordance with a priority approach. It is appreciated that a variety of different priorities can be implemented. In one embodiment, priority access to a power smart channel is given to a user that is authorized for the priority. The user can gain authorization for priority due to a variety of factors (e.g., pays an appropriate fee, earns the priority, etc.). In one exemplary implementation, priority to a power smart channel is given to a particular mobile device. The mobile device can gain authorization for priority due to a variety of factors (e.g., power supply has diminished to a threshold level, the device is in a particular location, the device is communicating particular type of content, etc.). Priority can be given to a user in an emergency situation (e.g., communicating with police, emergency medical services, fire department, etc.). For example, a user trapped in a remote area with a limited battery supply may be given or assigned a power smart channel with maximized ability to facilitate power conservation, including full interference-free characteristics, multiple resource bands, access to overriding relay capability, and so on (e.g., even if the enhanced power smart channel access is at the expense of dramatically reducing caller volume of one or more base stations, interfering with relay mobile devices other communications, etc.).

As previously indicated, location of a mobile device can have significant impact on a power smart channel method. In one embodiment, selection of power smart channel with a particular power conservation mechanism can be influenced by a location of the mobile device. In one embodiment, there may be various impacts or "costs" associated with different types of power conservation mechanisms. In one exemplary implementation, selection of power smart channel with a particular power conservation mechanism may be somewhat limited for a mobile device close to a cell boundary edge while a mobile device close to the base station may have more options. In one embodiment a power saving state or mode is configured based upon a particular location of the mobile device with respect to the base station, identified by the path loss or signal strength measurement.

As previously indicated in FIGS. 2A and 2B, in one embodiment utilizing an interference restriction power conservation mechanism when a mobile device is close to a boundary edge can result in an impact or cost to a neighboring cell (e.g., the neighboring cell is restricted or prohibited from using a channel, etc.). However, in one embodiment, utilizing a multiple channel power conservation mechanism (e.g., with low-rate MCS levels, etc.) when a mobile device is close to a boundary edge can result can be more power efficient and have less impacts on neighboring cells. Using multiple channels with low MCS as a power conservation mechanism can cause less interference to others as well (due to lower power). Therefore, multiple channel power conservation mechanism schemes can be used across the network so that cells in a sense can gain from each other.

However, while utilizing a multiple channel power conservation mechanism may not impact neighboring cells very much, as previously indicated, utilizing a multiple channel power conservation mechanism can have an impact or "cost" in the local cell of reducing the number of channels available. In one embodiment, an interference restriction conservation mechanism that considers closeness to a base station can be used when a mobile device is close to the base station. In one exemplary implementation, an interference restriction conservation mechanism (e.g., similar to that illustrated in FIG. 8, etc.) that relies on coordination with neighboring cells to keep transmission power levels low (e.g., rather than completely restricting or prohibiting them, etc.) and away from other cells can facilitate power conservation with little or no impact or costs for a local or neighboring cell (e.g., neither cell has to completely prevent or loose use of a channel, etc.).

While most of the detailed description is presented from the view point of smart power channel selection, it is appreciated that a number of mobile devices do not approach the issue as a direct selection of a particular power smart channel, rather the mobile devices utilize a power savings mode approach. In one embodiment, mobile devices operate based upon power savings modes and power smart channels are associated with power savings modes. In one exemplary implementation, a power smart channel method includes a power savings mode request process in which a mobile device requests one or more power savings modes and a power smart channel is selected based upon the power savings mode request. The power savings mode level requested (e.g., how many channels or how much saving requested, etc.) can depend on a variety of factors, (e.g., including battery charge, quality of service (QoS), urgency, locations, special cases, a (VIP) mobile device requesting the highest power saving modes (even without battery issue), etc.). A mobile device can switch services between the power saving modes and non-power saving modes based on demand (e.g., via request signaling, etc.).

It is appreciated that a power savings mode can be triggered in a variety of ways. The power savings mode can be triggered automatically or manually. The trigger can be associated with various initiating conditions (e.g., changing location, changing battery level, changing situation (e.g., emergency, purpose of communication, application, etc.), time limit on particular power consumption, etc.). In one exemplary implementation, entering a power savings mode in response to a trigger includes a power smart channel communication process (e.g., similar to block 320, process 500, etc.).

In one embodiment, a power savings mode is associated with a power smart channel(s) and whether or not the mode is available to a user can be linked to the technical qualification review process (e.g., similar to block 510) and authorization review process (e.g., similar to block 520) associated with the particular power smart channel(s). A power savings mode may be selected or changed (automatically or manually) based on a variety of scenarios. The scenarios can include: changing location, a user's situation (e.g., desperate situation, whether there is an emergency or urgency, want to extend life of battery dramatically, etc.), a user selecting a desired power savings mode, a current battery power level of a mobile device, a priority condition, and so on.

In one embodiment, a power saving mode reference table (e.g., stored as a database in the memory of the base station, mobile device, etc.) can be utilized to track what types of power savings modes are available. FIG. 13 is a block diagram of a power saving mode reference table 1300 in accordance with one embodiment of the present invention. In one exemplary implementation, a cellular network may provide ten levels of power savings modes which may be associated with use a combination of different schemes.

In one embodiment, available power savings modes may be determined and communicated to the mobile device. Available power savings associated with different power savings mode can be stored in a base station. As illustrated in FIG. 13, "Ind 1" may be associated with a mobile device that is near a cell edge or a worst location and that there isn't much room for improvement. While "Ind 10" may indicate that the mobile device is near a best location and that there is much more room for power savings improvement.

The availability of a power saving mode may depend on the user's demands and willingness to pay corresponding fees (e.g., fee corresponding to cost of providing, scaling power saving access fees, etc.). In one embodiment, the level of power savings achievable may be based on a combination of different aspects (e.g., location interference reduction, use of multiple channels, MCS downgrade, etc.). In one embodiment, an empirical table (e.g., sent by network, etc.) may be used to map the channel conditions of a mobile device at a certain location to an effective or "best fit" power savings mode. As discussed herein, there are a variety of available power savings states or modes. In one exemplary implementation, a mobile device is currently not in a power savings mode and may manually select a fixed power savings mode based on the user's current needs and associated service fees. Such a selectable power savings mode may be selectively powered off at any time. In another embodiment, a mobile device is already in a power savings state or mode and would like the cellular network to automatically adjust the power savings modes dynamically as locations, conditions, and circumstances change (with the user also paying for any corresponding service fees).

In one embodiment, an exemplary mobile device with an enabled power savings mode may determine which power savings modes may be selected or switched between. Possible schemes for power savings mode selection include: normal mobile device operation (e.g., no power savings mode used, etc.), low battery operation (e.g., power savings mode configuration based on battery usage, etc.), emergency operation (e.g., power savings mode configured for highest power savings mode service, etc.), VIP operation (power savings mode configured for highest or close to highest power savings mode service, etc.), and economic operation (power savings mode configuration based on a particular mobile device's location or potential power savings range indication). In one embodiment, power savings modes illustrated in FIG. 13 may be directly related to power savings levels each can provide and correspond to different pricing levels. Power savings mode options availability may change from location to location.

A potential power savings range indicator may be used to indicate a mobile device's signal quality or (predefined) location and a corresponding level of power savings available (e.g., Ind1-Ind10). The available power saving can depend on the location or the relative signal strength from the serving base station and other adjacent base stations. For example, even if a mobile device is near a cell edge, if adjacent base stations are not transmitting and the mobile device is using multiple channels, the mobile device could still achieve the maximum power savings. Therefore, an exemplary mobile device with a signal quality or location value of "Ind K" may utilize network resources for power savings modes K and below. However, the higher order power savings modes may also be served, but may not very effectively, due to mobile device channel quality location.

In one embodiment, there may be a plurality of selectable exemplary levels of low power utilization available. For example, one or more of the power-savings features may be utilized depending upon a level of power savings selected. These power savings features include providing channels with reduced interference that provide lower power requirements (e.g., from either a minimal interference reduction to a maximum possible interference reduction, etc.), fast fading priority scheduling, allowing a mobile device to use multiple channels. Each of these features provide an opportunity to further reduce power requirements to further save energy.

The availability of a power conservation or savings mode can be based on certain user measurable metrics, such as location, down load (DL) pilot signal strength at the mobile device, and so on. A percentage of power savings for an allocated channel can be defined by a selected power savings mode. As also discussed herein, there may also be location dependent power savings levels available. For example, for a given location A, power savings modes 1-10 may be available, but for a given location B, only power savings modes 1-7 are available. In one embodiment, a mobile device may be in a bad or undesirable location where there is not much more that can be done to reduce the power requirements of the available channels.

In one exemplary embodiment, a user in an emergency situation may be provided full power savings (e.g., and one or more channels with a highest level of channel interference reduction, etc.) regardless of system capacity limitations and without financial considerations.

With reference back to FIG. 1, In one embodiment, display screen 110 of the mobile device 102 may be used to indicate power savings modes or levels that are available. It is appreciated the display screen 110 may also display other available power savings features that may provide further power savings (e.g., availability of mobile device relays, multiple channels, and other power savings techniques). In one embodiment, a mobile device may be notified of available power savings features through accessing at least one of a database (e.g., stored in the memory 108, etc.), a receipt of a broadcast channel transmitted by the base station, or by similar means. In one embodiment, there is a potential power savings range indicator of the available channels.

Therefore, in one embodiment, a user may select from one or more power savings levels displayed on a display screen 110 of a mobile device 102. In one embodiment, an exemplary display screen 110 is an interactive display. The display can be a touch responsive display screen capable of receiving and interpreting a user's input, such that through an interaction with the display screen, a user may choose from the one or more selectable power savings mode options. Various characteristics of a power savings mode may be presented. A corresponding price (e.g., fee, predefined cost, etc.) can be presented. A situation or need (e.g., emergency, low batter, etc.) associated with the power savings mode can be presented. In one embodiment, the one or more power savings mode options are selectable through a mobile device.

In one embodiment, a fee is associated with a power conservation or savings mode or power smart channel. Users of a power savings mode (e.g., wanting to make use of the power smart channels, etc.) may be separately charged for using power savings modes. A pricing structure may be directed to increased additional fees for the higher power savings modes (e.g., smart power channels with greater power conservation capability, etc.). The fees can be supply and demand based (e.g., higher fees for power conservation mode with larger demand for low supply or availability of power smart channels, etc.). The fee can be directed to compensating the cellular provider for providing the power savings features. A cellular provider may have to make provisions for accompanying increase of resource usage as well as restriction of resource usage (e.g., interference restrictions on use of a channel in neighboring cells, etc.).

In one embodiment, power savings mode users may be billed in general for any additional resources utilized. There may be some exceptions. In one embodiment, a second mobile device (e.g., 1220 providing the ad hoc relay, etc.) is provided with a power savings mode (with low power channels) during the ad hoc connection, where the fees for the power savings mode can be charged upon the first mobile device 1230. As also discussed, there may be an exception in emergency situations. Therefore, as discussed herein, in general an additional charge may be required to use the power savings modes.

Figure 14:
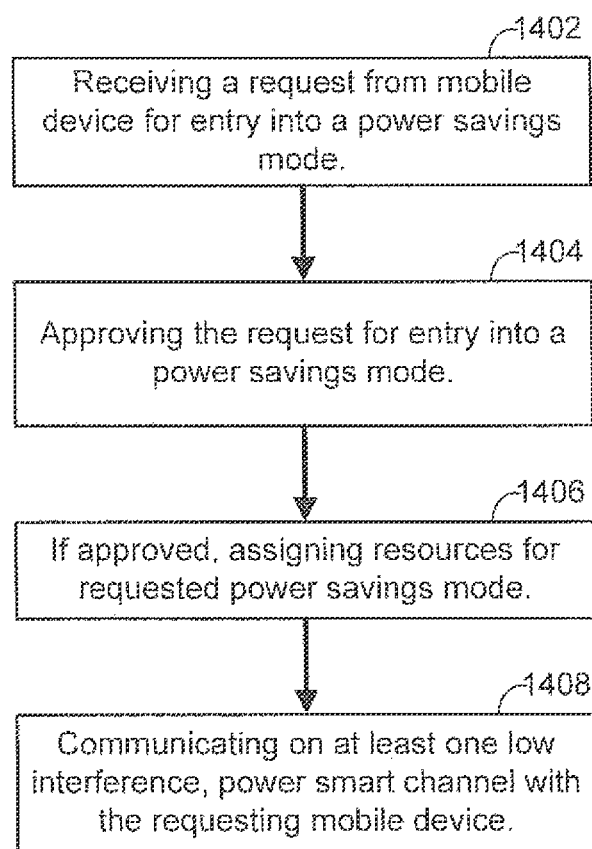
FIG. 14 illustrates exemplary computer executed steps of a process for managing power savings modes provided by a wireless telecommunications system.

FIG. 14 illustrates exemplary computer executed steps of a process for managing power savings modes provided by a wireless telecommunications system. In step 1402 of FIG. 14 a request is received from a mobile device 1410 for entry into a power savings mode. In one embodiment a plurality of selectable power savings modes or levels are provided to the mobile device 1410. In step 1404 of FIG. 14B, the request for entry into a power savings mode is approved if there are sufficient resources available. As discussed herein, such a consideration may cross-reference the mobile device's current location with respect to a base station with criteria entered into a database.

In step 1406, if the request is approved, the resources may be allocated for a selected power savings mode out of the requested one or more selectable power savings modes. As discussed herein, depending on the resources available and the level of power savings modes available, given the mobile device's location and requested service scenario, the requested power savings mode may be granted, or a lower power savings mode may be granted. In step 1408, at least one low power channel is provided to the requesting mobile device 1402 such that the low power channel with low interference allows the mobile device to operate at a lower power level to conserve battery life.

In one embodiment, a mobile device method includes participating in a power smart channel method. In one exemplary implementation, the power smart channel method includes participating in a power smart channel selection process, including requesting one or more power smart channels for power saving service; and participating in power smart channel communications. The selection of the power smart channel can be performed by a mobile device when a network broadcasts an indication of available power smart channels. The mobile device can select a power smart channel associated with a particular power conservation mechanism, including selecting from a group of power conservation mechanisms (e.g., a single channel configuration with a single resource band, multiple channel configuration with multiple resource bands, and relay configuration, etc.). The power smart channel selection or power conservation mechanism selection can be dependent upon how much power saving capability is desired, wherein the amount of power saving capability that is desired is based upon various factors (e.g., such as remaining battery charge, quality of service, urgency, location, etc.). The mobile device can be considered a special case and can use the highest power saving modes even without concern for battery issues. The mobile device can switch services between a power saving mode and a non-power saving mode based on demand via request signaling. The mobile device can support power smart channel capability and can be used as a relay to help another mobile device to communicate via a power smart channel. In one embodiment, a power While most of the description is directed towards uplink communications, there are also several techniques that may be utilized to reduce downlink reception time requirements. For example, by coordinating with neighboring base stations, power may be reduced to improve spectral efficiency. There may also be location dependent power savings mode levels available. In one exemplary embodiment, an uplink power savings mode selected may be different from a selected downlink power savings mode selected. Signaling channels may also use similar techniques, for example, priority may also be given to users in power savings modes during random access. In one embodiment, a mobile device that needs to continually save power, such as a wireless sensor device (e.g., a meter), may also use these power savings modes.

In one embodiment, an exemplary downlink may reduce transmit time due to improved spectral efficiency and may further reduce a mobile device's active time. In one embodiment, different locations within a base station coverage area may experience different levels of neighbor interference. Therefore, some power savings mode (low power) channels may be categorized based upon the region being used. With some coordination, a cellular tower or base station, may have less "costly" channels for different locations in their coverage areas.

Thus, presented approaches facilitate an effective and efficient solution for preserving battery life in a mobile devices. There are many advantages to the exemplary embodiments as described herein as compared to conventional power saving schemes. There may be a significant market potential as systems providing exemplary power savings modes may be branded. An exemplary implementation of power savings schemes may be implemented as a mobile application supported by specific infrastructure (using higher layer signaling) or by using a standardized message. A mobile device may be provided with an exemplary power saving feature such that a user could use a mobile device for a longer period of time in spite of low battery power. Therefore, utilization of exemplary power saving schemes can facilitate increased battery life especially when the user is out in the field or talking to a client with a mobile device with only a partially charged battery. In one embodiment, even if an exemplary mobile device is short on battery life, improved battery life may be selectively provided for urgent calls. The life of a mobile device battery can be extended. Another advantage over conventional power saving schemes is that because exemplary power saving schemes have different levels (e.g., power savings modes or power saving schemes), and simple "neighbor do not use" solutions to location based and signal combining solutions, vendors with smart solutions may take advantage of this.

Therefore, exemplary embodiments may have implement one or more of the presented schemes whereby a user is able to selectively use low power channels in a power savings mode for which the required power used to send a same amount of data is reduced: special channels prepared and kept at a cell tower or base station, special priority mechanisms set up at the cell tower or base station, different levels of power saving may be selected based on the user's situation, and multiple channels may be used for the uplink to save power.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Although certain preferred embodiments and methods have been disclosed herein, it will be apparent from the foregoing disclosure to those skilled in the art that variations and modifications of such embodiments and methods may be made without departing from the spirit and scope of the disclosure. It is intended that the disclosure shall be limited only to the extent required by the appended claims and the rules and principles of applicable law.

What is claimed is:

1. A power conservation method, comprising:
    performing, by a base station, a power smart channel establishment process, including:
        analyzing various aspects of a communication environment, including aspects that impact an ability of the base station to receive transmissions sent by one or more mobile stations at low power levels, to determine environment conditions; and
        configuring one or more power smart channels for uplink communication with one or more power conservation mechanisms, based upon the environment conditions, the one or more power smart channels being free upon being configured; and
    after performing the power smart channel establishment process, initiating, by the base station, a power smart channel communication process after a mobile device requests or triggers use of at least one of the one or more power smart channels, the initiating of the power smart channel communication process including:
        determining which of the one or more of the power smart channels is available based upon a priority of the mobile device relative to priorities of other mobile devices, and upon the mobile device meeting prerequisites for uplink communication via at least one of the one or more power smart channels that are available; and
    performing a power smart channel activation process to enable the base station to receive transmissions sent by the mobile device over the at least one of the one or more power smart channels that are available, the at least one of the one or more power smart channels that are available associated with a first power saving mode and a second power saving mode for selection by the mobile device, wherein both the first power saving mode and the second power saving mode associated with the at least one of the one or more power smart channels that are available enable the base station to receive the transmissions sent by the mobile device at lower power transmission levels than otherwise required for receiving the transmissions sent by the mobile device, the first power saving mode having a lower power transmission level than the second power saving mode.

2. The power conservation method of claim 1, wherein at least one of the one or more power conservation mechanisms includes allocating multiple resource bands to a power smart channel.

3. The power conservation method of claim 1, wherein at least one of the one or more power conservation mechanisms includes communication through a relay.

4. The power conservation method of claim 1, wherein the priority is based on one or more of: information indicative of power reserve of batteries in the mobile device received from the mobile device, payment of a fee and an emergency situation.

5. The power conservation method of claim 1, wherein at least one of the one or more power conservation mechanisms includes combined-transmitting/receiving on multiple power smart channels associated with the mobile device and combining information communicated on the multiple power smart channels.

6. The power conservation method of claim 1, wherein the first power saving mode is mapped to a combination of the at least one of the one or more power smart channels that are available, the at least one of the one or more power conservation mechanisms, one of the prerequisites for uplink transmissions via the at least one of the one or more power smart channels that are available.

7. The power conservation method of claim 1, wherein the power smart channel establishment process further including configuring the one or more power smart channels with the one or more power conservation mechanisms based upon a traffic generation pattern.

8. A communication system, comprising:
one or more base stations configured to establish one or more power smart channels that facilitate conservation of power in uplink transmissions and to configure the one or more power smart channels with one or more power conservation mechanisms based upon environment conditions, wherein the one or more power smart channels are configured for uplink transmissions at a power level lower than otherwise required to overcome distance and interference, and wherein the one or more power smart channels are free upon being established, and wherein at least one of the one or more power smart channels is associated with a first power saving mode and a second power saving mode for selection by one or more mobile devices, wherein both the first power saving mode and the second power saving mode associated with the at least one of the one or more power smart channels enable the one or more base stations to receive the uplink transmissions sent by the one or more mobile devices at lower power transmission levels than otherwise required for receiving the uplink transmissions sent by the one or more mobile devices, the first power saving mode having a lower power transmission level than the second power saving mode; and
the one or more mobile devices operable in at least the first power saving mode or the second power saving mode, wherein the communication system is configured to:
determine which of the one or more of the power smart channels is available; and
select, after the one or more power smart channels are established, at least one of the one or more power smart channels that are available based upon a priority of the one or more mobile devices relative to priorities of other mobile devices, and upon the one or more mobile devices meeting prerequisites for uplink transmissions via the at least one of the one or more power smart channels that are available.

9. The communication system of claim 8, wherein selecting the at least one of the one or more power smart channels that are available is based upon a location of the one or more mobile devices.

10. The communication system of claim 8, wherein the one or more power smart channels are configured for power transmission levels lower than other channels.

11. A base station comprising:
a non-transitory memory storage comprising instructions; and
one or more processors in communication with the non-transitory memory storage, wherein the one or more processors execute the instructions to:
analyze various aspects of a communication environment, including aspects that impact an ability to of the base station to receive transmissions sent by one or more mobile stations at low power levels, to determine environment conditions;
configure one or more power smart channels for uplink communication with one or more power conservation mechanisms, based upon the environment conditions, the one or more power smart channels being free upon being configured;
after the analyzing and the configuring, and after a mobile device requests or triggers use of at least one of the one or more power smart channels for uplink communication, determine which of the one or more of the power smart channels is available for uplink communication based upon a priority of the mobile device relative to priorities of other mobile devices, and upon the mobile device meeting prerequisites for uplink communication via at least one of the one or more power smart channels that are available; and
perform a power smart channel activation process to enable the base station to receive transmissions sent by mobile device over the at least one of the one or more power smart channels that are available, the at least one of the one or more power smart channels that are available associated with a first power saving mode and a second power saving mode for selection by the mobile device, wherein both the first power saving mode and the second power saving mode associated with the at least one of the one or more power smart channels that are available enable the base station to receive the transmissions sent by the mobile device at lower power transmission levels than otherwise required for receiving the transmissions sent by the mobile device, the first power saving mode having a lower power transmission level than the second power saving mode.

12. The base station of claim 11, wherein at least one of the one or more power conservation mechanisms includes a restriction on interference.

13. The base station of claim 12, wherein the restriction on interference is based upon use of a resource band in a neighboring cell.

* * * * *